United States Patent
Kokotov et al.

(10) Patent No.: US 9,712,108 B2
(45) Date of Patent: Jul. 18, 2017

(54) CORDED LATTICE BASED FLOATING PHOTOVOLTAIC SOLAR FIELD WITH INDEPENDENTLY FLOATING SOLAR MODULES

(71) Applicant: Solaris Synergy (Israel) Ltd., Maale Adumim (IL)

(72) Inventors: Yuri Kokotov, Maale Adumim (IL); Yossi Fisher, Jerusalem (IL); Shlomo Caine, Jerusalem (IL)

(73) Assignee: Solaris Synergy (Israel) Ltd., Jerusalem (IL)

( * ) Notice: Subject to any disclaimer, the term of this patent is extended or adjusted under 35 U.S.C. 154(b) by 0 days.

(21) Appl. No.: 14/771,550

(22) PCT Filed: Mar. 5, 2014

(86) PCT No.: PCT/IL2014/050215
§ 371 (c)(1),
(2) Date: Aug. 31, 2015

(87) PCT Pub. No.: WO2014/136107
PCT Pub. Date: Sep. 12, 2014

(65) Prior Publication Data
US 2016/0006391 A1     Jan. 7, 2016

Related U.S. Application Data

(60) Provisional application No. 61/851,403, filed on Mar. 7, 2013.

(51) Int. Cl.
*H02N 6/00*     (2006.01)
*H01L 31/042*     (2014.01)
(Continued)

(52) U.S. Cl.
CPC .............. *H02S 40/36* (2014.12); *F24J 2/4638* (2013.01); *F24J 2/5232* (2013.01); *F24J 2/5241* (2013.01);
(Continued)

(58) Field of Classification Search
CPC .......... H02S 10/40; H02S 30/00; H02S 30/10; H02S 30/20; F24J 2/5241; F24J 2/5267; F24J 2/5269
See application file for complete search history.

(56) References Cited

U.S. PATENT DOCUMENTS 3,844,236 A * 10/1974 Boyajian ................ B63B 35/34
                                                        114/266
4,214,572 A *  7/1980 Gonder ...................... F24J 2/07
                                                        126/568
2012/0305051 A1   12/2012 Kokotov et al.

FOREIGN PATENT DOCUMENTS

WO    WO 2011100590 A2 *  8/2011 ............. B63B 21/50
WO       2012072941        6/2012

OTHER PUBLICATIONS

PCT Search Report, PCT/IL2014/050215, Aug. 3, 2014.

* cited by examiner

*Primary Examiner* — Eli Mekhlin
(74) *Attorney, Agent, or Firm* — Dekel Patent Ltd.; David Klein

(57) ABSTRACT

Provided herein is a floating photovoltaic solar device designed to reduce the effect of wind forces without the use of external control or power. The device includes a floating anchored frame with a means for connecting an internal corded lattice; a corded lattice suspended within the floating frame and forming a set of polygonal cells in which independently floating solar photovoltaic modules are positioned. Access for scheduled and unscheduled maintenance (Continued)

may be provided by a floating service gantry. The system is modular and several devices may be connected in a honeycomb-like structure.

8 Claims, 25 Drawing Sheets

(51) Int. Cl.
*H02S 40/36* (2014.01)
*H02S 20/30* (2014.01)
*H02S 10/40* (2014.01)
*H02S 40/10* (2014.01)
*F24J 2/46* (2006.01)
*F24J 2/52* (2006.01)

(52) U.S. Cl.
CPC ........... *F24J 2/5264* (2013.01); *F24J 2/5267* (2013.01); *H02S 10/40* (2014.12); *H02S 20/30* (2014.12); *H02S 40/10* (2014.12); *Y02E 10/47* (2013.01)

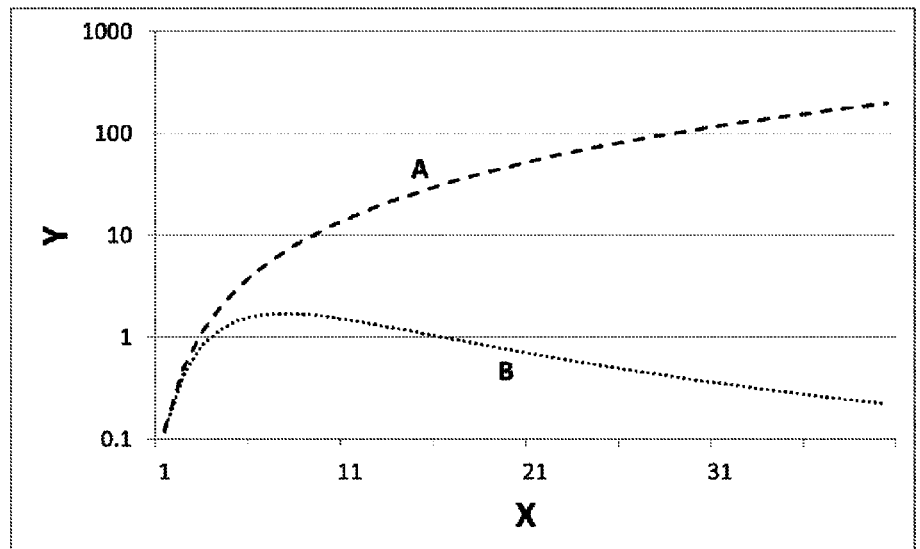
Fig. 20a
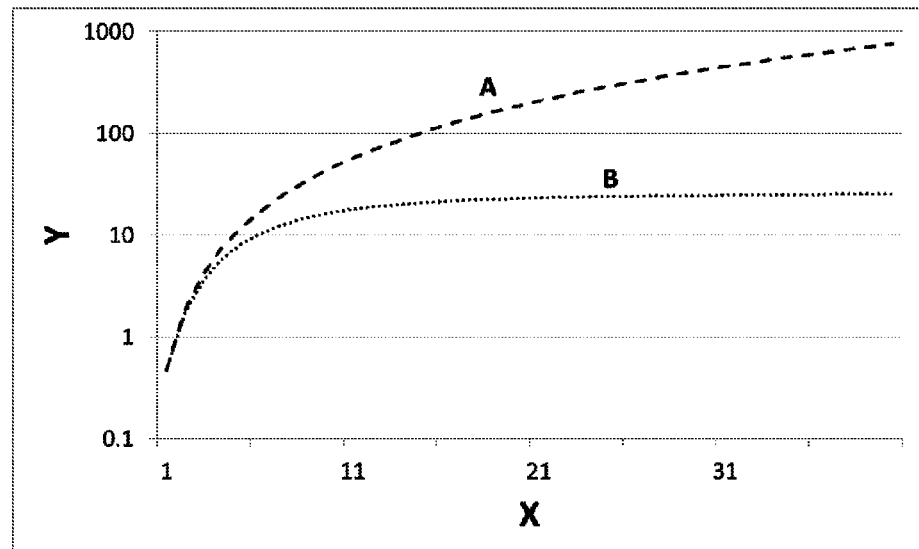
Fig. 20b
FIG. 20

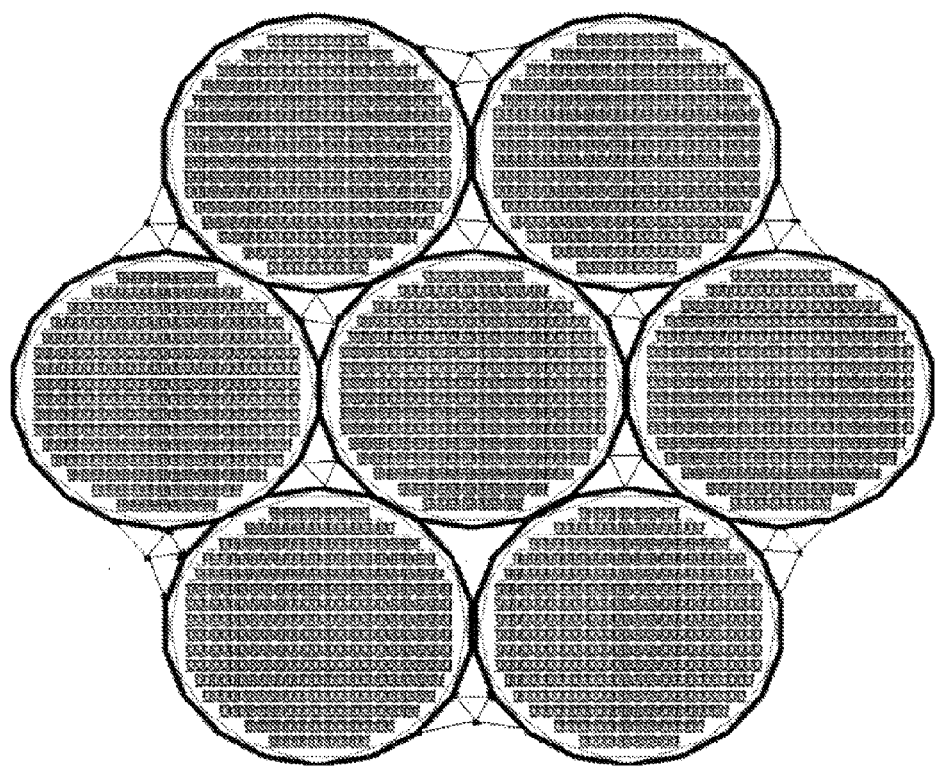
Fig. 25b
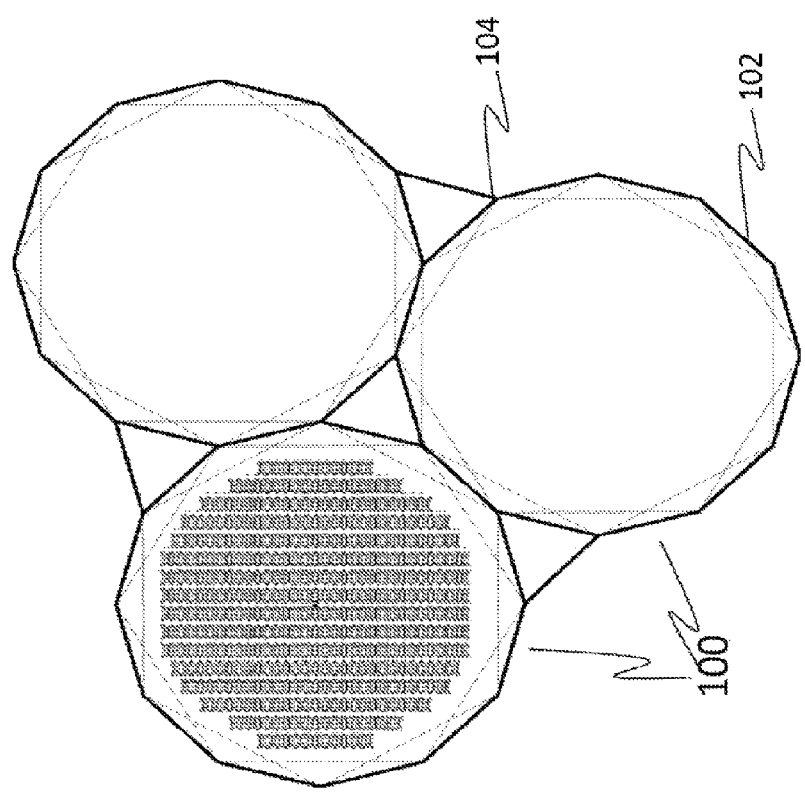
Fig. 25a
FIG. 25

CORDED LATTICE BASED FLOATING PHOTOVOLTAIC SOLAR FIELD WITH INDEPENDENTLY FLOATING SOLAR MODULES

CROSS-REFERENCE TO RELATED APPLICATIONS

The present application claims priority to U.S. Provisional Application Ser. No. 61/851,403 filed Mar. 7, 2013 and entitled "A Guy-Wire Based Floating Photovoltaic Solar Field With Floating Solar Panels" the entire contents of which are incorporated by reference herewith.

FIELD AND BACKGROUND OF THE INVENTION

In existing floating photovoltaic systems, the solar modules are rigidly fixed on an anchored floating platform, a rigid or semi-rigid anchored floating framework, or an anchored platform made up of interconnected floating rafts. These types systems are disadvantageous because they require inter alia a) a large quantity of materials which may complicate the assembly process and make installation expensive and b) significant strengthening of the structure and the anchoring mechanism due to the accretion of wind-generated drag and elevation forces on the system.

In principle one could take a solar module, place it on floats, anchor it and leave it to freely float. Also, one could connect a number of modules and create a solar field in the form of a floating carpet. However such a system of any appreciable size may not withstand the action of waves and wind. Wind loads on the modules will accumulate causing weak links to break, while wave action may cause the floating carpet to deform.

Placing the floating carpet under tension may either break the connections between the modules or the modules themselves. For this reason, a floating carpet of free floating modules e.g. modules not connected in a rigid or semi-rigid structure, do not exist in practice and present an unmet need.

SUMMARY OF THE PRESENT INVENTION

The present disclosure provides a system comprising solar-electric generating modules, such as photovoltaic modules, and a method for construction of such a system on the surface of a water body in such a way as to maintain the ability of the system to float on the surface of the water in a defined area while allowing flexibility and a degree of freedom of movement to the individual modules.

The system maintains its integrity in the presence of winds and waves. The system is constructed such that all the elements are under tensile or compressive stress, without bending or twisting stresses, thus maintaining the form and shape of the system while allowing movement and flexibility to accommodate wind loads and movement of the water surface due to environmental forces such as waves and tides.

In one aspect, provided herein is a floating solar field system comprising a frame to which an internal corded lattice is attached and having solar-electric generating modules positioned in the lattice. The lattice is a system of tensed interconnected cords forming a network of polygonal cells with a node at each corner. Nodes in defined points of the cords provide defined connection points for at least some of the modules and prevent the relative shift of the modules between nodes. The solar-electric generating modules may be for example, photovoltaic modules. The modules may be connected to the nodes, to each other or both to a node and to each other. In some embodiments, the modules are connected to one or more nodes directly or indirectly.

The frame of the system may be contiguous or may be segmented. A segmented frame may be polygonal, where the term polygonal refers to a closed plane figure bounded by three or more line segments, for example three, four, five, six, seven or more line segments. For example a triangle is a three sided polygon, a quadrilateral is a four sided polygon, a pentagon is a five sided polygon and the like. In the system described herein for example, a number of floating beams may form a closed segmented frame, while frame cords connected to these beams form them into a regular polygonal shape and radial anchoring cords keep the polygon in place.

In an alternative embodiment of the floating device, the floating frame may be constructed of a single floating rigid member or a plurality of rigid floating sections which are permanently and rigidly connected together.

In yet another embodiment of the floating device, the floating frame may be constructed of a Torus filled with a gas, for example air.

In some embodiments, the segmented frame is made from rigid floating segments, joined at hinges, hinged joints, and capable of maintaining a polygonal structure through the use of tension frame cords. In an alternative embodiment of the floating device, the floating frame may be constructed of a single floating rigid member, for example a circular (i.e. circle, oval, ovoid) member and includes a plurality of lattice tension cord catches.

In some preferred embodiments, the frame is a segmented polygonal frame with frame cords connected to the frame beams, for example at hinged joints, and lattice tension cords attached to the frame, for example via the hinged joints or via lattice tension cord catches.

The system may further include one or more photo-voltaic modules floating inside the abovementioned corded lattice, for example within one or more cells and where the corded lattice is connected by means of lattice tension cords to the frame formed by the floating beams.

According to some embodiments, the floating photo-voltaic modules are not rigidly connected but are loosely or flexibly connected with one or more nodes of said corded lattice and/or with each other, and/or with any other elements of the floating solar field. In some embodiments each module is attached directly to one or more nodes. In some embodiments, each nodule is attached indirectly to one or more nodes.

In some embodiments, a plurality of floating polygons of approximately the same size and each with a number of segments divisible by 6, are connected in a honeycomb structure sharing mutual segments or hinges.

According to some preferred embodiments, the planes of the photo-voltaic modules are independently slightly tilted for example between 5-45 degrees in relation to the horizon. Each individual floating photo-voltaic module may be held buoyant by a floatable means, for example a float made of a floatable material such as polymerized foam which may be attached to one or more photo-voltaic module via an attachment means. In some embodiments, one or more of the photo-voltaic modules has an extension, such as a leg, to which the floatable means are attached.

The floatable material may be shaped such that the floating photo-voltaic modules are able to independently change their angle of tilt relative to the horizon, in response to varying wind loads and waves, resulting in reduced wind resistance.

In preferred embodiments, the device comprises a floating frame comprising individual rigid segments. These segments, also known as floating frame beams, are connected one to another by a connection means, for example hinged joints. In some embodiments, each frame beam has a frame link at each of its two ends and the frame links may be attached to one another by an eye bolt, for example. Furthermore, each given hinge/hinged joint is connected via frame cords to at least two other hinges, one on either side of the given hinge, where each of the two other hinges are the closest hinged joints not immediately adjacent to the given adjacent hinge (e.g. one hinge removed).

In alternative embodiments each given hinge may be connected via additional frame cords to one or more additional hinges that are non-adjacent to the given hinge.

A lattice of lattice cords may be connected to the floating frame using lattice tension cords which are attached to the hinged joints of the floating frame beams. A plurality of photovoltaic modules is placed within the lattice formed by the lattice cords. The device may be anchored to the shore or to the bed of the water body upon which the system is floating, using an anchoring means, for example anchoring cords.

According to some preferred embodiments of the floating device, the corded lattice may be constructed of segments of cords interspersed with rigid "U"-Link sections shaped such that they are partially above water and partially submerged, and provide an unhindered passage for mobile floating elements to traverse the corded lattice.

In some embodiments, each solar module (e.g. photovoltaic module) is tilted relative to the horizon such that a first end is higher than a second end due to each respective first and second individual floats having different submerged and above-water parts. For example, the floats of the higher end are differently shaped than the lower end floats enabling a tilt angle of the module and enabling reduction of wind forces acting upon the module by reducing the module tilt angle when there is wind, without the use of any external control or power. This design provides an advantage over the known systems.

In some embodiments, the device further comprises a mobile floating service gantry configured to travel within the internal corded lattice. The connecting elements (e.g. U links) between at least some of the nodes are rigid and at least partially submerged enabling passage of the floating service gantry.

In some embodiments, the floating service gantry includes a deck and two floating hulls, wherein the deck straddles the floating modules and the floating hulls of the gantry float on either side of the floating modules wherein the gantry can travel along a designated or undesignated service lane. Such a service lane may be for example an empty row of cells or a space between rows of cells.

In other embodiments the device further comprises within the floating lattice a plurality of floating service bridges, which may or may not be interconnected, and which provide access to the individual modules for purposes of service and maintenance.

In yet other embodiments, two or more devices may be interconnected, for example via their frames, to form a larger floating device which may be anchored by a single anchor attached to a peripheral frame.

In further embodiments, the device includes one or more electrical connection of the photovoltaic modules to the shore via electrical cables. In some embodiments, each row of modules is electrically connected by an electric cable which may run the length of the row of modules. The electrical cables may be gathered at one or more connection boxes from which electricity may be transferred to the shore, for example by means of an electric cable to an electric load.

The frame of the device is anchored to the shore or to the water bed. In some embodiments, anchoring of the device is such that the position of the field is maintained under conditions of changing water depth, without the anchor exercising significant vertical submersing force upon the floating solar field, enabled by the use of a buoy and a weight in between the device and a land based or a water-bed based anchor.

In yet another aspect, provided herein is a method of constructing a floating solar photovoltaic device, comprising:

anchoring a floating frame to a land or a water bed anchor;

suspending an internal corded lattice inside the floating frame forming a plurality of polygonal cells with nodes at their corners; and attaching a plurality of independently floating solar photovoltaic modules to at least a plurality of the cells at their nodes or to each other.

In some embodiments, the method further comprises a gantry, configured to travel within the internal corded lattice. The floating photo-voltaic modules may be serviced by means of mobile floating service gantries, free to travel in service lanes between the photovoltaic modules within the corded lattice or by floating service bridges within the lattice.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIGS. 20*a* and 20*b* provide graphs representing a mathematical simulation demonstrating the effectiveness of the abovementioned embodiment of self-adjusting photo-voltaic module floats under the influence of wind.

FIG. 25 is scheme showing possible links between floating frames to form a larger system.

Figure 1:
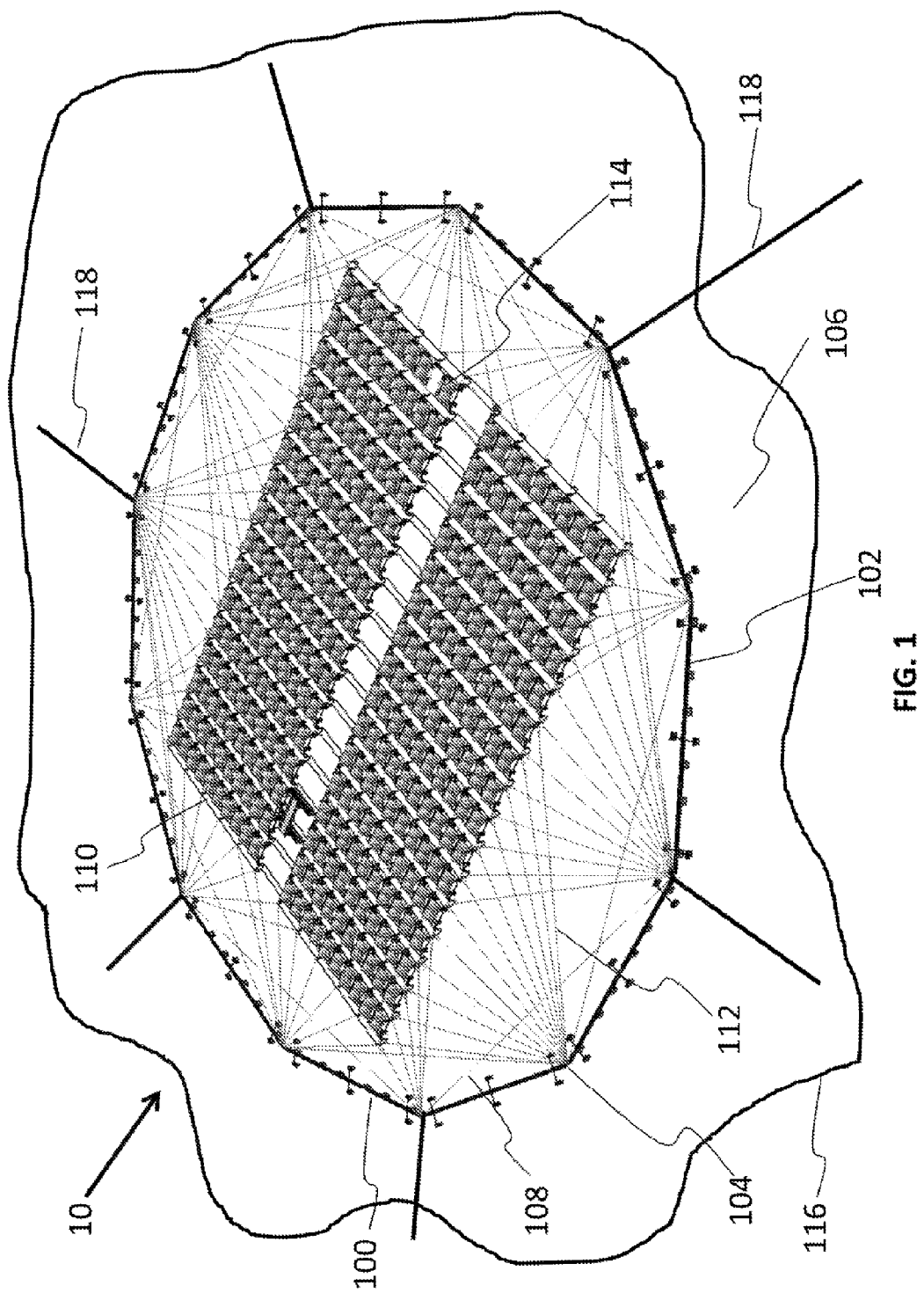
FIG. 1 is a view from above of a device with a segmented frame as disclosed herein.

Note that all figures are not necessarily to scale.

DESCRIPTION OF SPECIFIC EMBODIMENTS OF THE INVENTION

It is appreciated that certain features of the disclosure, which are, for clarity, described in the context of separate embodiments, may also be provided in combination in a single embodiment. Conversely, various features of the present disclosure, which are, for brevity, described in the context of a single embodiment, may also be provided separately or in any suitable combination or as suitable in any other described embodiment of the invention. Certain features described in the context of various embodiments are not to be considered essential features of those embodiments, unless the embodiment is inoperative without those elements.

Although the disclosure has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The patent application mentioned in this specification is herein incorporated in its entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

An all tension, cord-based floating photo-voltaic solar electric device is now presented. For the purposes of this document a "cord" is meant to mean an example of a cable, wire, chain, rope or other flexible medium that is used to brace various elements of the system described below.

The term "frame cords" refers to cables, wire, chains or the like that attach to the frame and may assist in maintaining a polygonal shape to a segmented frame. "Frame cords" are also known as "guy strings" or "chordal cords". The frame cords and all other cords mentioned herein including but not limited to lattice cords, lattice tension cords, module cords, and anchoring cords may be made from materials such as Stainless Steel, Rope, Glass Fibers or any other flexible material, and may be from about 1 mm to about 20 mm in diameter, from about 2 mm to about 15 mm in diameter or from about 2 mm to about 8 mm in diameter.

The "system" may also be referred to as an "installation" or "device" and includes a floatable frame which may be contiguous or segmented, an internal lattice suspended from the frame by suspension means and forming a lattice of polygonal cells with nodes at their corners; and independently floating solar photovoltaic modules present within a plurality of the cells and attached to the nodes directly or indirectly.

Polygonal refers to a closed plane figure bounded by three or more line segments. For example three, four, five, six, seven or more line segments. For example a triangle is a three sided polygon, a quadrilateral is a four sided polygon, a pentagon is a five sided polygon and the like.

Referring to FIG. 1, the system 10 comprises a floating frame 100 including a number of individual rigid segments called floating frame beams 102 connected by hinged joints 104. The floating frame 100 is positioned on the surface of a water body 106. The floating frame 100 may be held in a rigid shape by a series of frame cords 108 which are attached to the hinged joints 104 at the extremities of the floating frame beams 102. A lattice of lattice cords 110 may be connected to the floating frame 100 by a number of lattice tension cords 112 which may be attached to the hinged joints 104 of the floating frame beams 102. Within the lattice formed by the lattice cords 110, a plurality of photovoltaic modules 114 is present. Finally, the entire assembly may be anchored to the shore 116 or to the bed of the water body 106 upon which the system is floating, by means of anchoring cords 118.

In an alternative embodiment of the system, the floating frame 100 may be constructed of a single floating rigid member (not shown) or a plurality of rigid floating sections (not shown) which are connected together. In some embodiments the rigid sections are permanently connected together.

Figure 2:
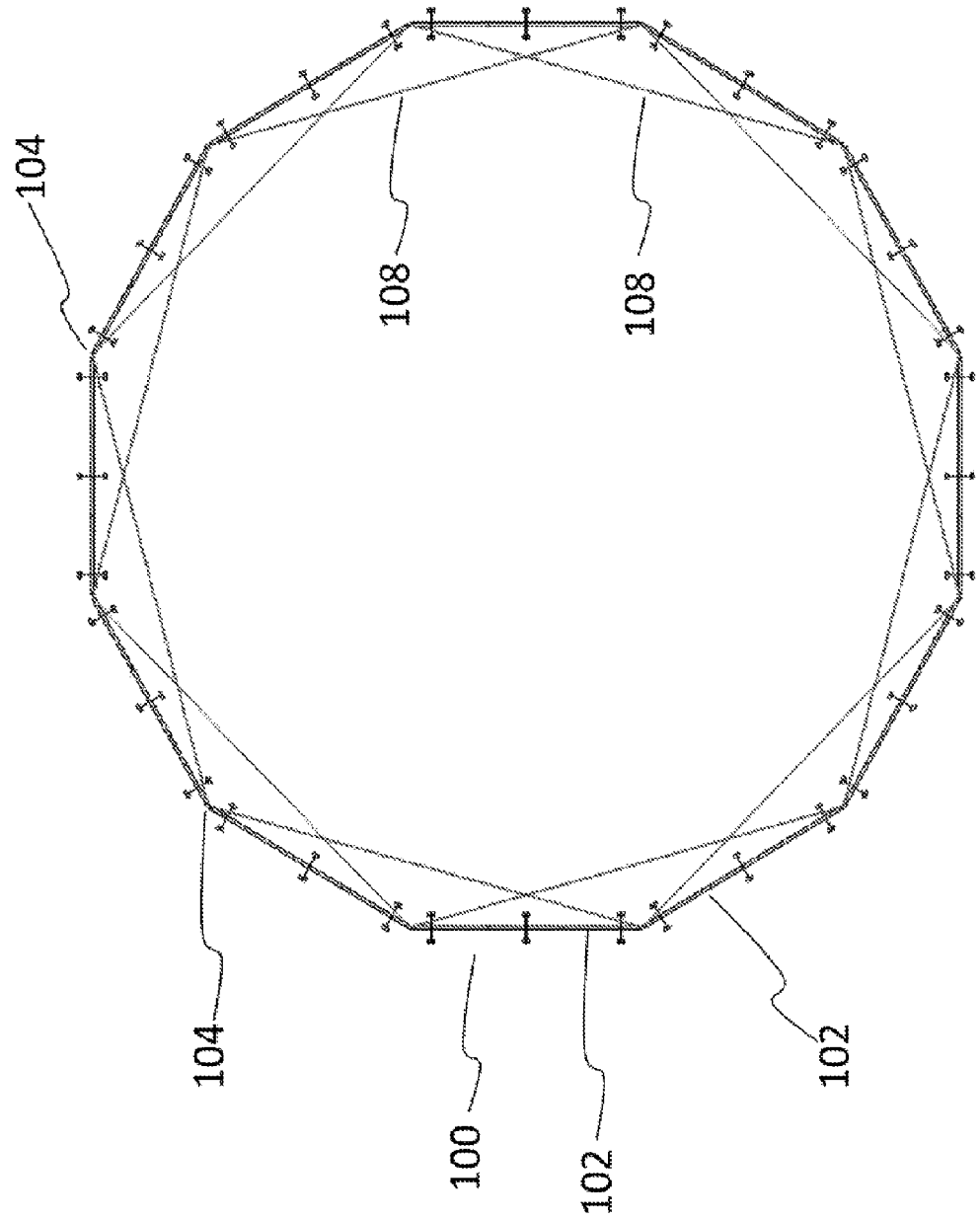
FIG. 2 is a schematic drawing of a segmented frame with the frame cords as disclosed herein.
Figure 3:
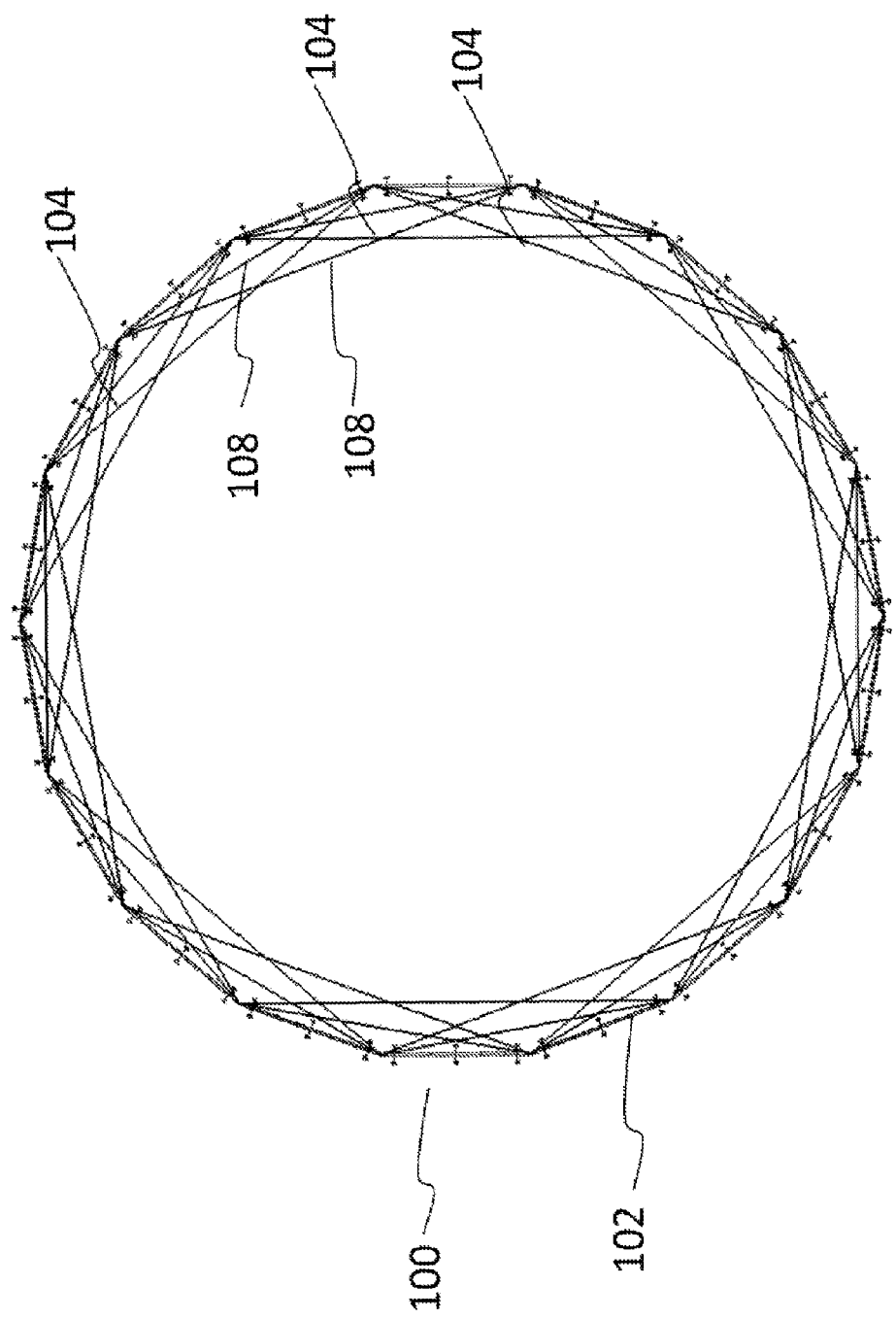
FIG. 3 is a schematic drawing of a segmented frame with the frame cords as disclosed herein.

Referring to FIG. 2 and FIG. 3 the connections of the frame cords 108 to the floating frame 100 are shown.

Referring to FIG. 2 it is shown that the frame cords 108 may be connected between the hinged joints 104 at the extremities of each two adjacent floating frame beams 102 of the floating frame 100. In this example each hinged joint 104 may be joined by frame cords 108 which connect hinged joints 104 that are at a distance of 2 hinged joints 104 to the right and left of each respective hinged joint 104. These are non-binding examples and it is appreciated that not every hinged joint 104 is necessarily connected to 2 hinged joints 104 at the same distance from each other as illustrated in FIG. 3.

Referring to FIG. 3 an exemplary alternative embodiment is shown of the connections where additional frame cords 108 may be connected between the hinged joints 104 at the extremities of any two of the floating frame beams 102 of the floating frame 100.

Figure 4:
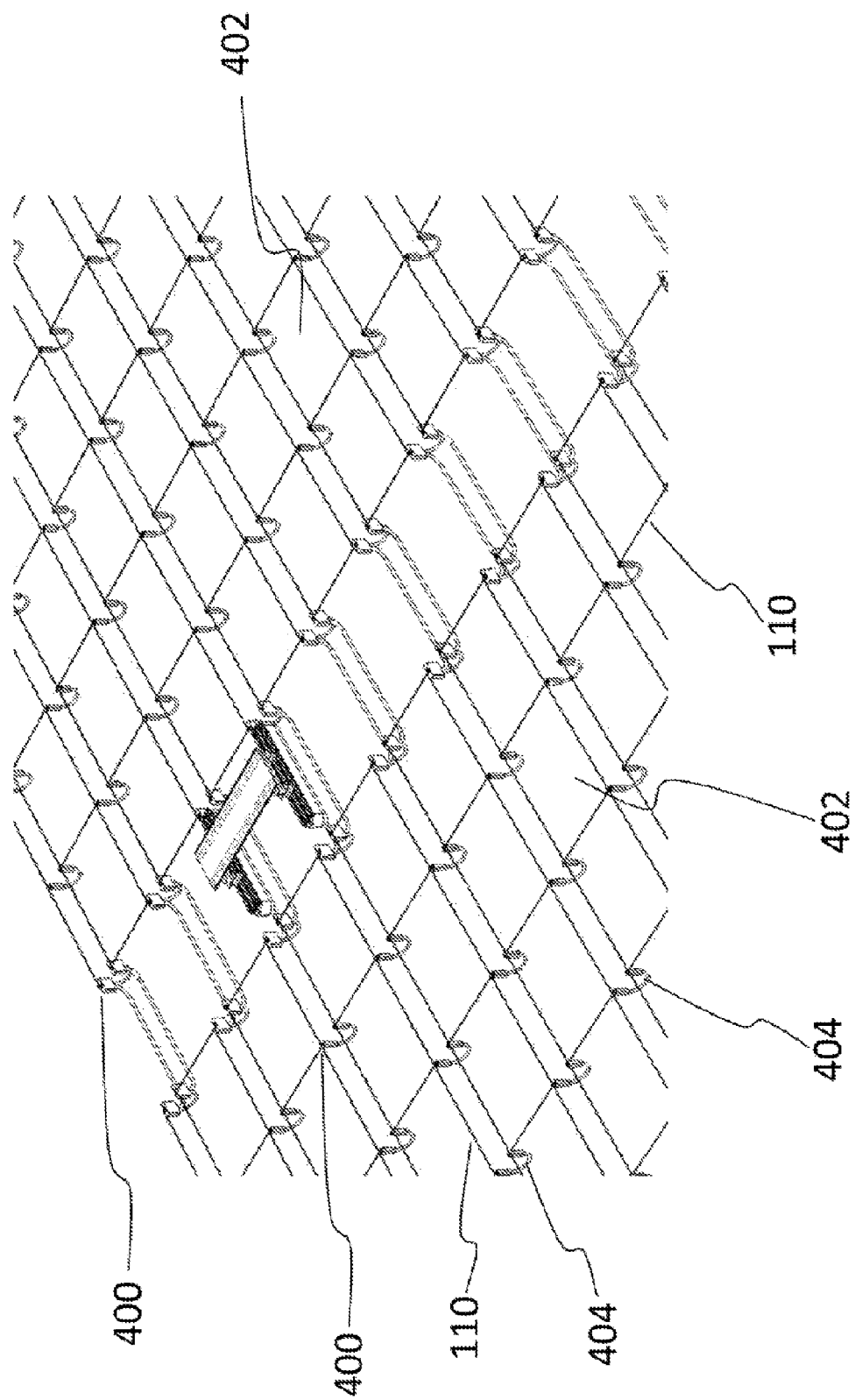
FIG. 4 is a schematic drawing of a portion of polygonal cells formed by the lattice of the device disclosed herein.

Referring now to FIG. 4, an example of an embodiment of a portion of the lattice/internal corded lattice is shown. Sets of lattice cords 110 are strung in such a way that they periodically cross at defined points known as nodes 400. At these nodes 400 the lattice cords 110 are fastened to each other. The polygon shaped space defined by the boundaries formed in this case by four of the lattice cords 110 is called a lattice cell 402 and is a four sided rectangle. Even though a 4 sided polygon is illustrated and described here, other polygons may be formed such as triangular or hexagonal which can be formed by the lattice cords 110.

Referring further to FIG. 4, it may be seen that in one embodiment, a plurality of the lattice cords 110 can be connected to a plurality of "U"-links 404 at the nodes 400. Note that not all of the lattice cords 110 are connected to "U"-links 404.

Figure 5:
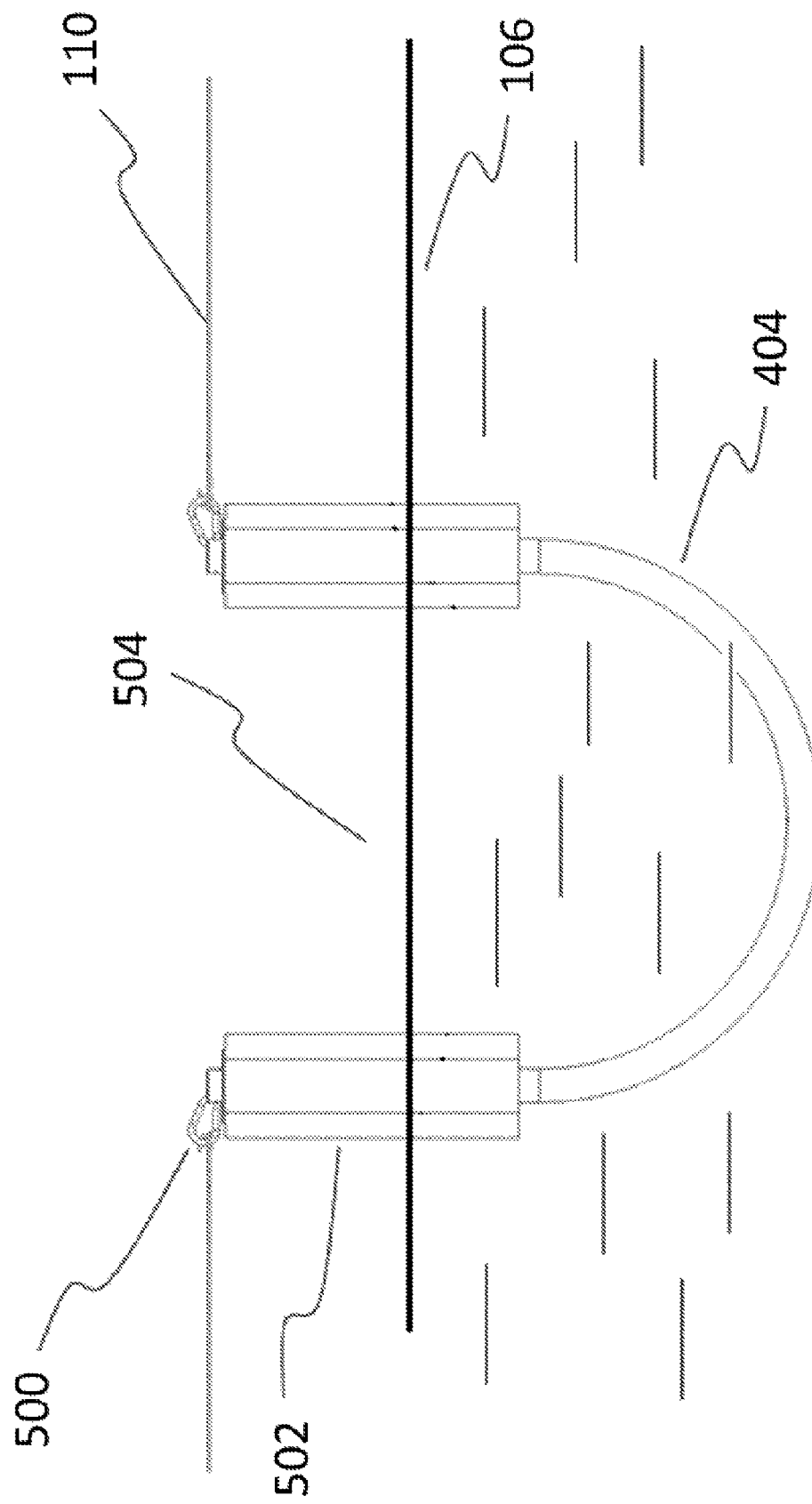
FIG. 5 is a schematic drawing of an exemplary rigid "U"-Links in the lattice.

Referring now to FIG. 5, an embodiment of the "U"-links 404 is shown. The link 404 is constructed of a rigid material such as stainless steel and is in the shape such as that of the letter "U", or of the letter "V", or of an open topped rectangle or any other shape which allows both extremities of the link 404 to be above the surface of the water while a portion of the link 404 is simultaneously submerged. Floats 502 constructed of a material such as a closed cell polymer foam ensure that the extremities of the "U"-link 404 are situated above the water surface 106 when the "U"-links 404 are submersed in water. The lattice cords 110 may be connected to the extremities of the "U"-link 404 by means for example of a quick release clip 500. The "U"-links 404 thus provide a continuous connection of the lattice cords 110 while affording a service lane 504 at the water surface 106 across the line of the lattice cords 110.

Figure 6:
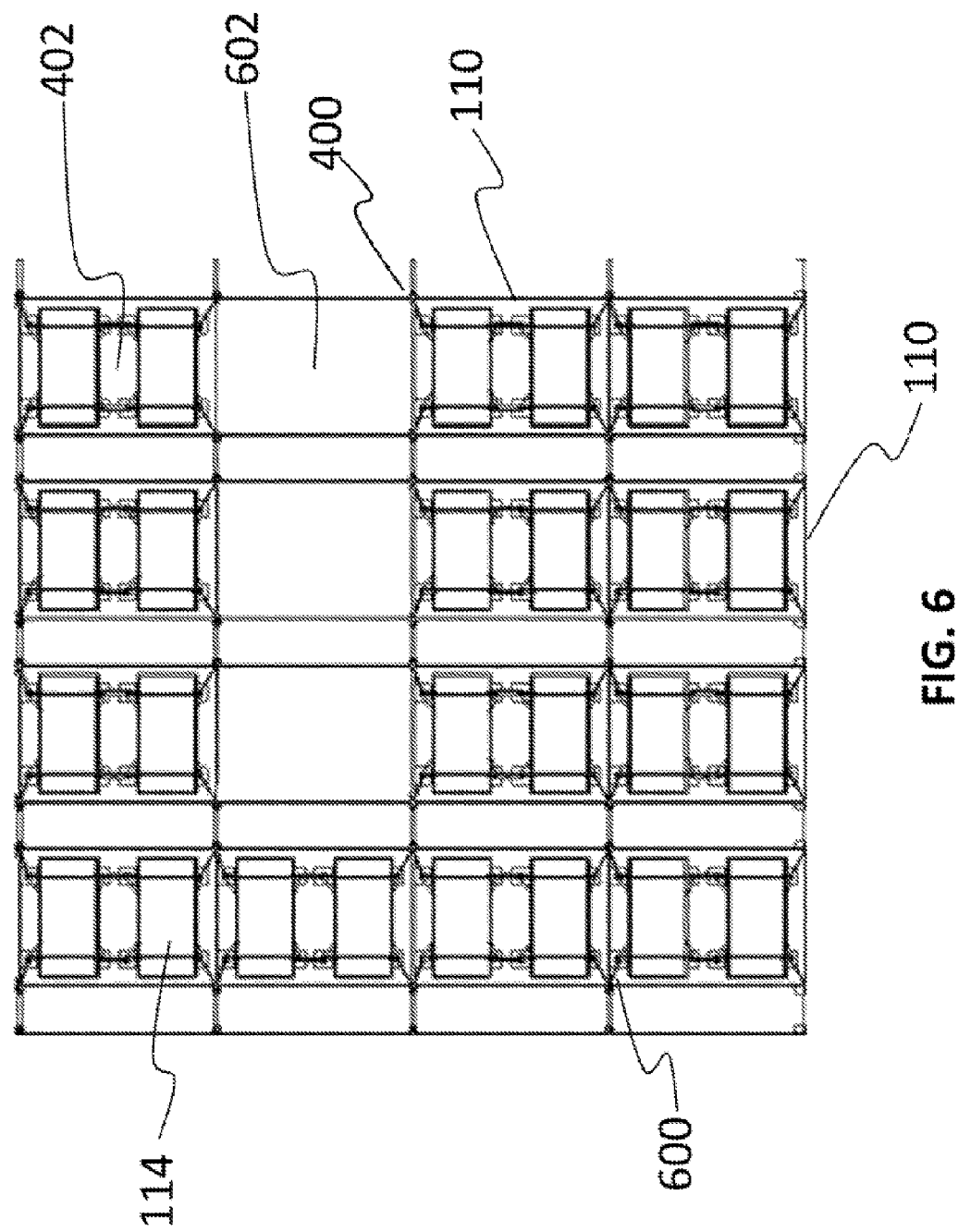
FIG. 6 is a schematic drawing of an array of Photo-Voltaic modules in the cells of the device disclosed herein.

Referring now to FIG. 6, an example of an embodiment of an array of photovoltaic modules 114 in the system 10 is shown in further detail. A number of photovoltaic modules 114 for example one, two or more modules 114 are present within a plurality of lattice cells 402 of the lattice formed by the lattice cords 110 and are loosely fastened to the nodes 400 of the lattice or to an adjacent module 114, by a fastening means either directly or indirectly, such as a module cords 600. Some lattice cells may remain empty 602 and not contain any modules.

Figure 7:
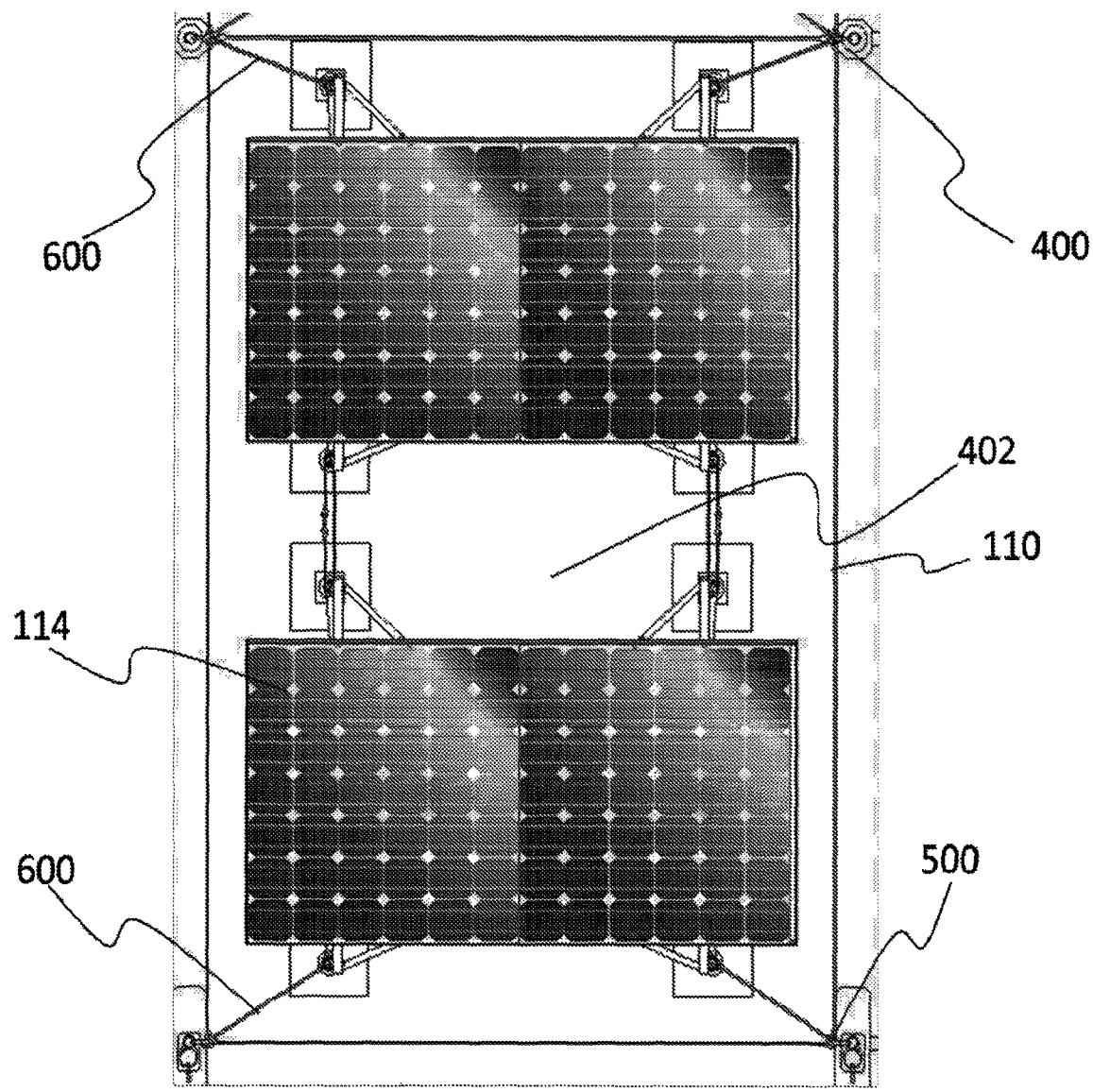
FIG. 7 is a schematic drawing of a cell enclosing free floating photo-voltaic modules.

Referring now to FIG. 7, details of a single cell 402 within the lattice of the system are shown. The photovoltaic modules 114 are connected to the nodes 400 of the lattice cords 110, or to another module 114 in the same cell 402 by means of the module cords 600. The lengths of the module cords 600 are designed such that the floating modules 114 have freedom to move slightly within the lattice cell 402, but cannot collide with each other and are constrained to a defined area. By this method, the forces (wind, waves etc.) acting upon each module 114 are transmitted to the main lattice cords 110, and thence to the external floating frame (not shown) in such a way as to isolate each module 114 from the forces acting upon other neighboring modules 114 in other cells 402. The module cords 600 can be attached to nodes 400 or to the adjacent module 114 by any means known to those skilled in the art such as quick release clips 500.

Figure 8:
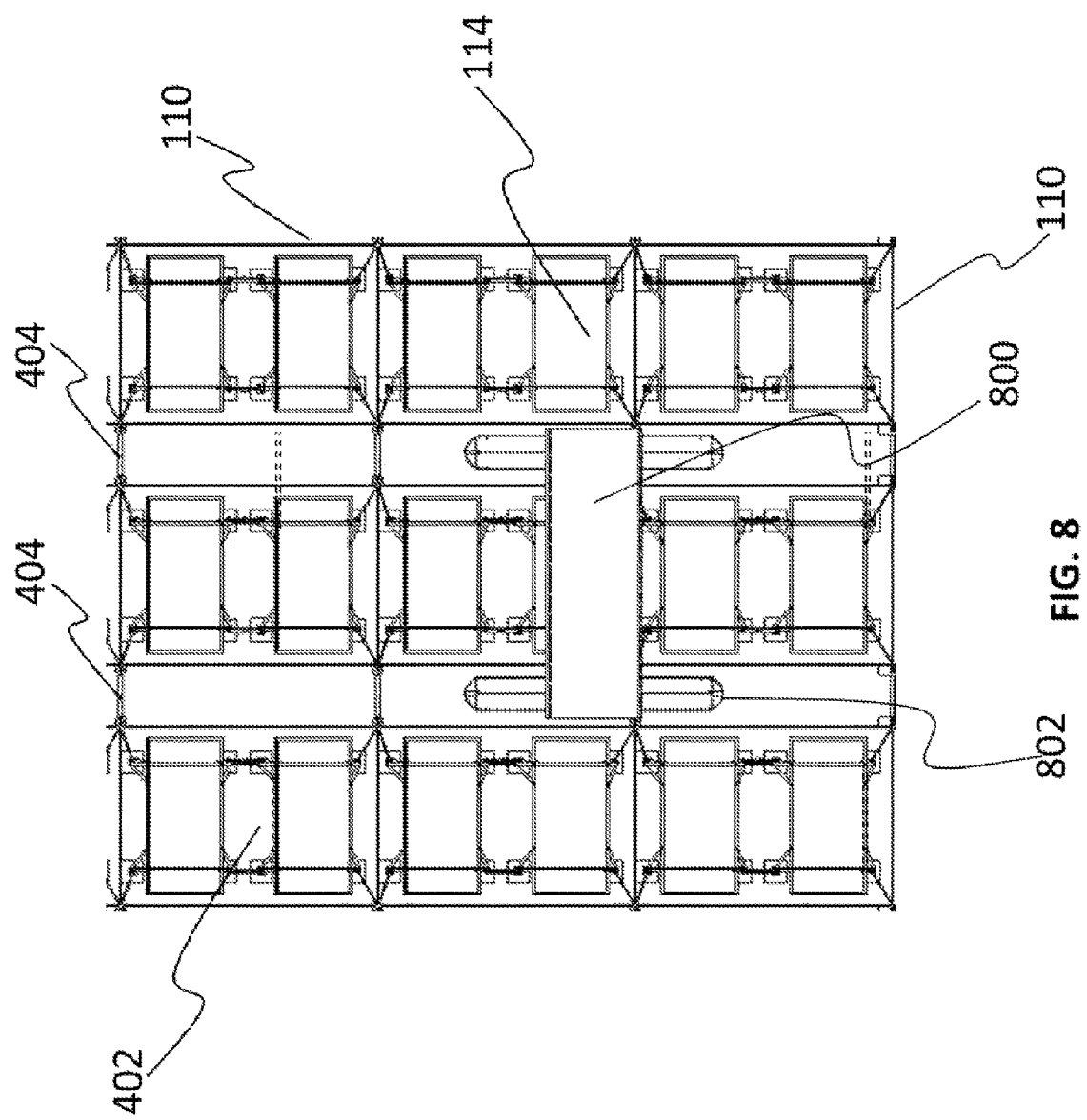
FIG. 8 is a schematic drawing of a mobile floating service gantry positioned within the device disclosed herein.

Referring now to FIG. 8, the details of an example of servicing means of the system are shown. A mobile service gantry 800 can be supported by two floating gantry hulls also known as pontoons 802 in such a way as to be positioned above the floating modules 114 and the bottommost part of the gantry body (not including the pontoon part) 800 is higher than the highest point of the modules 114. The pontoons 802 are free to move along the channel formed by the lattice cords 110, allowing the mobile service gantry 800 to access the modules 114 along a given column. "U"-links 404 or other shaped links as described above connect the horizontal lattice cords 110 between columns of floating modules 114 allowing the passage of the hulls 802 of the mobile service gantry 800 from one cell 402 to the next in an uninterrupted fashion.

Figure 9:
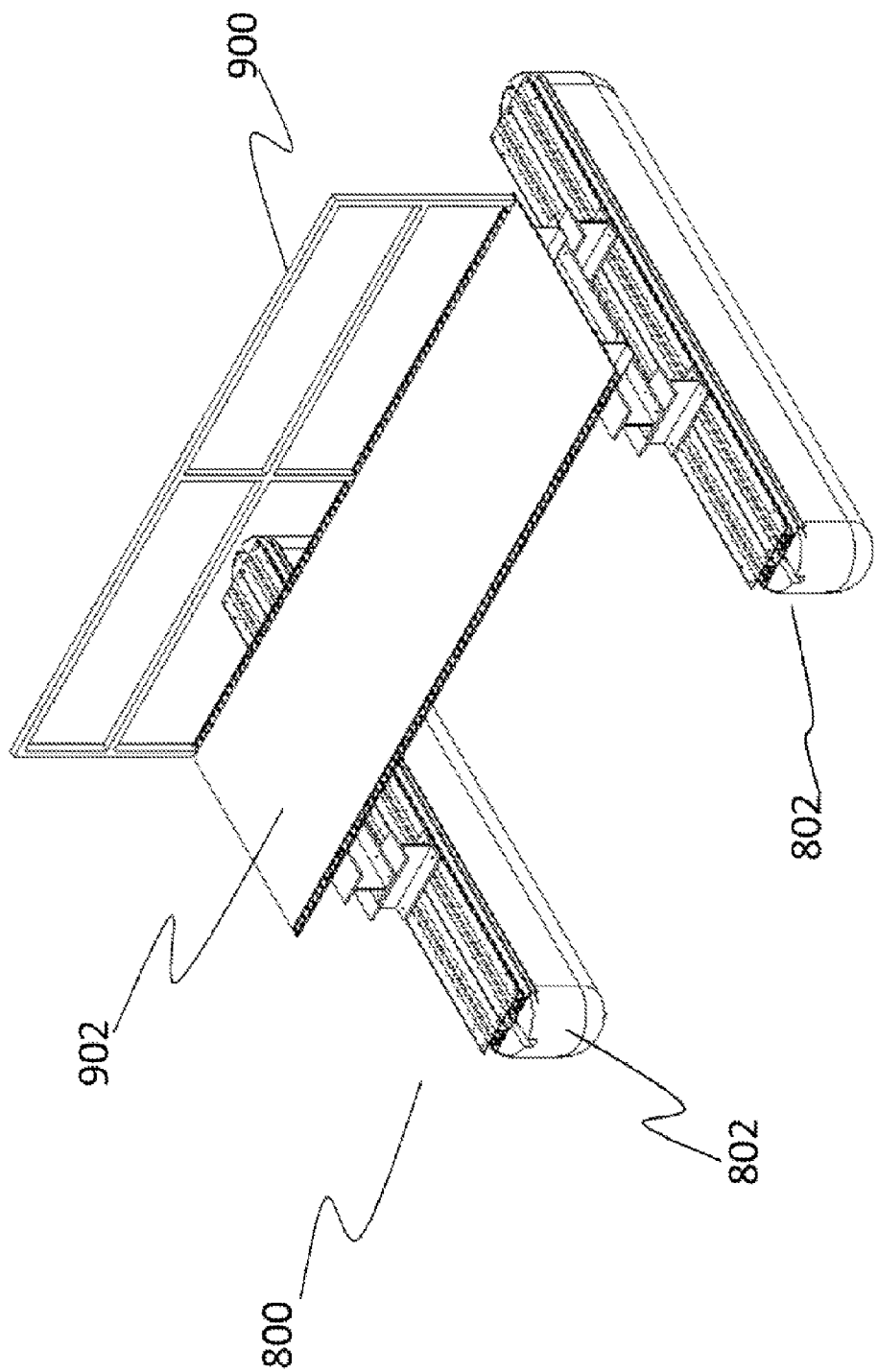
FIG. 9 is a schematic drawing of a mobile floating service gantry for the device disclosed herein.

Referring now to FIG. 9 a detailed schematic drawing is shown of an example of a floating service gantry 800 as described above. The floating service gantry 800 may include a deck 902 which may be made of a rigid water resistant material such as aluminum and which is supported by two floating pontoons 802 constructed of a rigid member mounted on a floatation material. An exemplary construction of the floating pontoons 802 may be similar to that used in the construction of the floating frame beams 102 shown in FIG. 12 below. A guard rail 900 may be provided on the gantry deck 902 to afford safety support for maintenance crew using the gantry 800.

Figure 10:
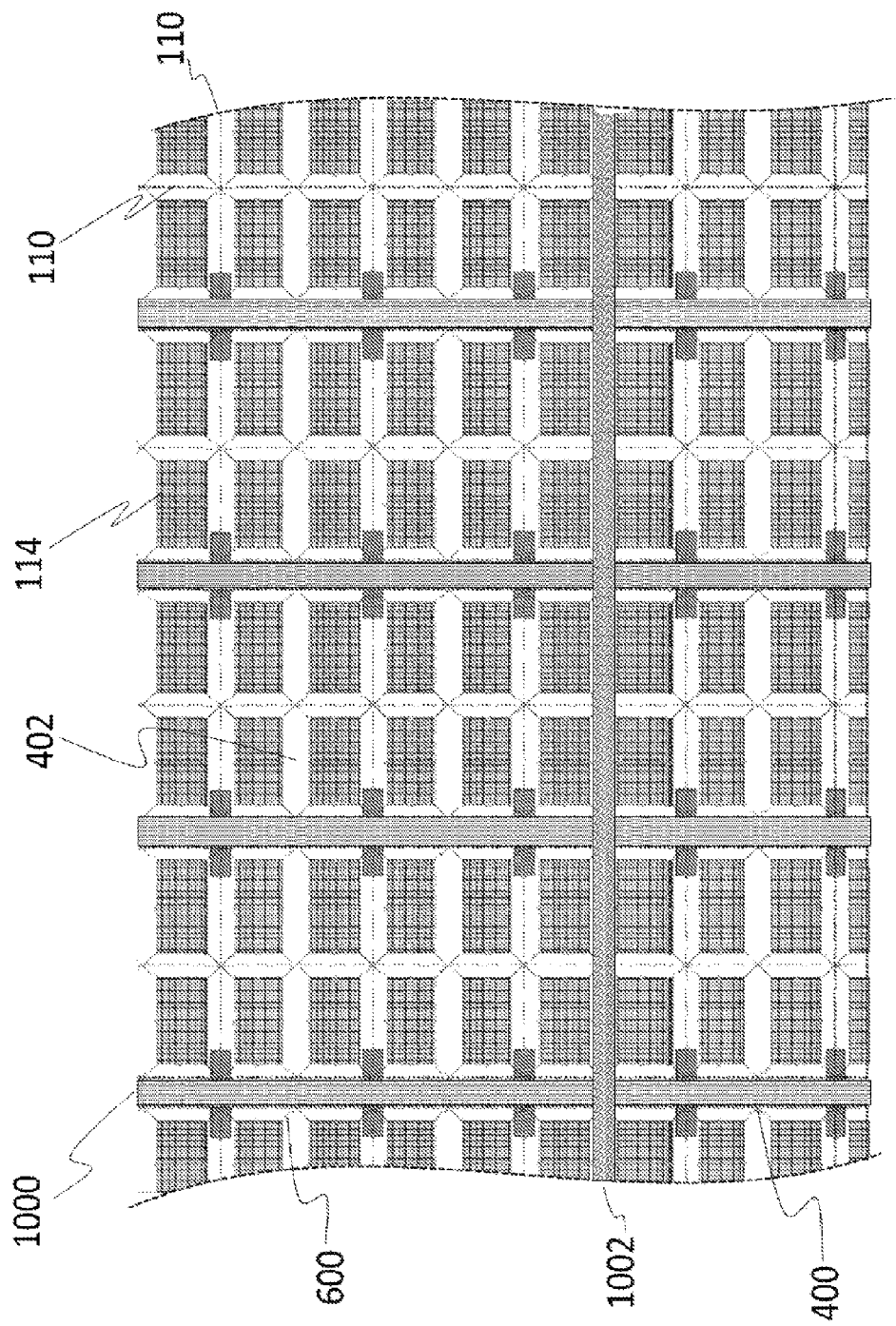
FIG. 10 is a schematic drawing of an alternative embodiment of the device disclosed herein with floating service bridges.

Referring now to FIG. 10 an example of an alternative embodiment of the floating photovoltaic system is shown. A plurality of photovoltaic modules 114 are present within the cells 402 of the lattice formed by the lattice cords 110 and are fastened in a not taught manner to the nodes 400 by a set of module cords 600. A plurality of floating auxiliary service bridges 1000 is provided, interconnected by a primary service bridge 1002, which provide access to the photovoltaic modules 114 for maintenance.

Figure 11:
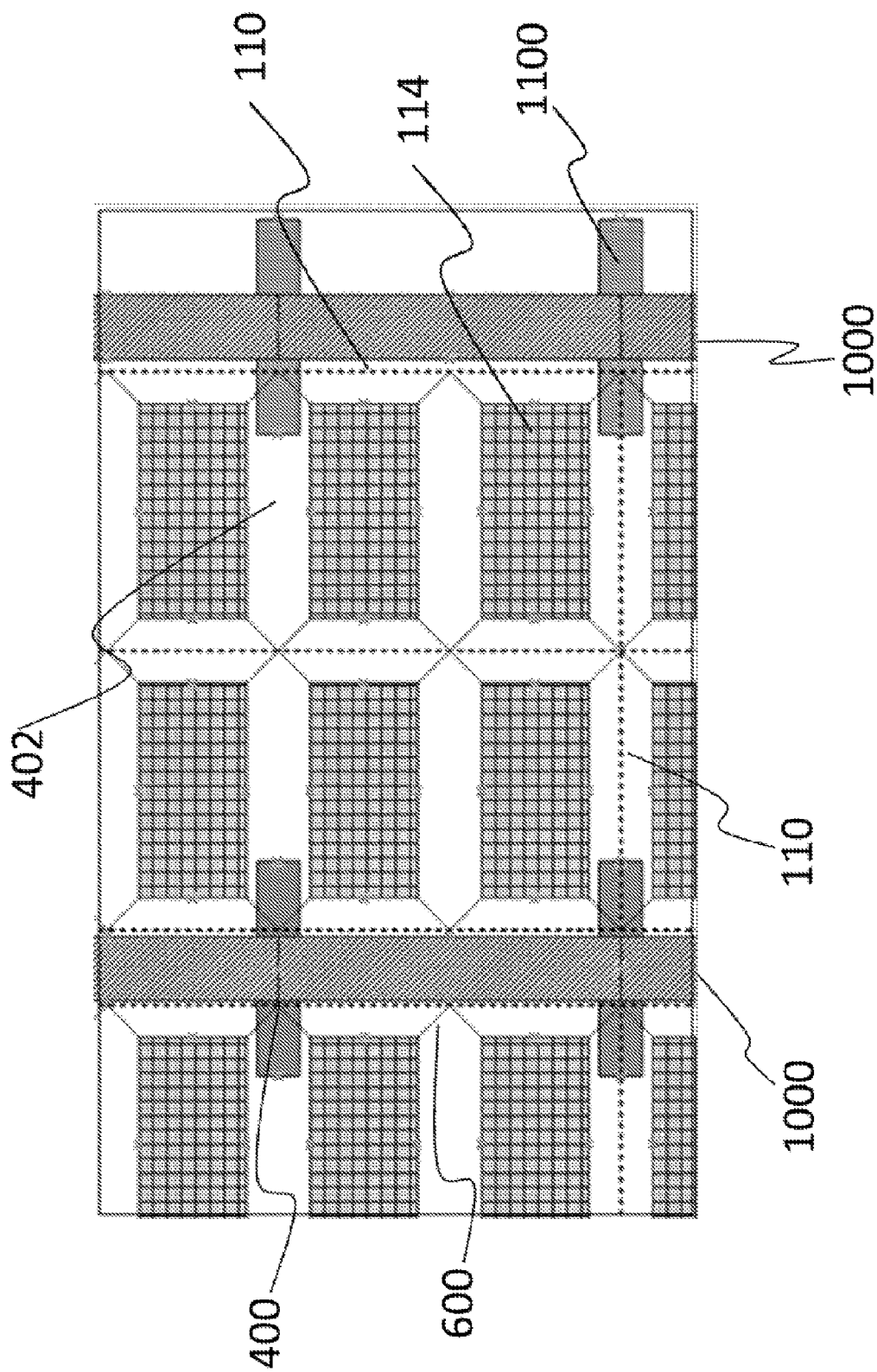
FIG. 11 is an enlarged view of the modules in FIG. 10.

Referring now to FIG. 11, details of the cell 402 of an alternative embodiment shown in FIG. 10, are shown. The photovoltaic modules 114 are free floating within the lattice formed by the lattice cords 110, and fastened in a non-taught manner to the lattice nodes 400 by a set of module cords 600. Floating service bridges 1000 can run the length of the lattice providing access to the photovoltaic modules 114 for purposes of maintenance. The service bridges 1000 are supported and stabilized by service bridge floats 1100 that can be connected perpendicular to the service bridges 1000 at regular intervals. The photovoltaic modules 114 are free to move to a certain degree within the lattice but are constrained to a defined area and do not collide with each other. By this method, the forces (wind, waves etc.) acting upon each photovoltaic module 114 can be transmitted to the lattice cords 110, and thence to the external floating frame (not shown) of the system in such a way as to isolate each photovoltaic module 114 from the forces acting upon its neighboring photovoltaic modules 114 and to distribute the overall force acting upon the external floating frame of the system.

Figure 12:
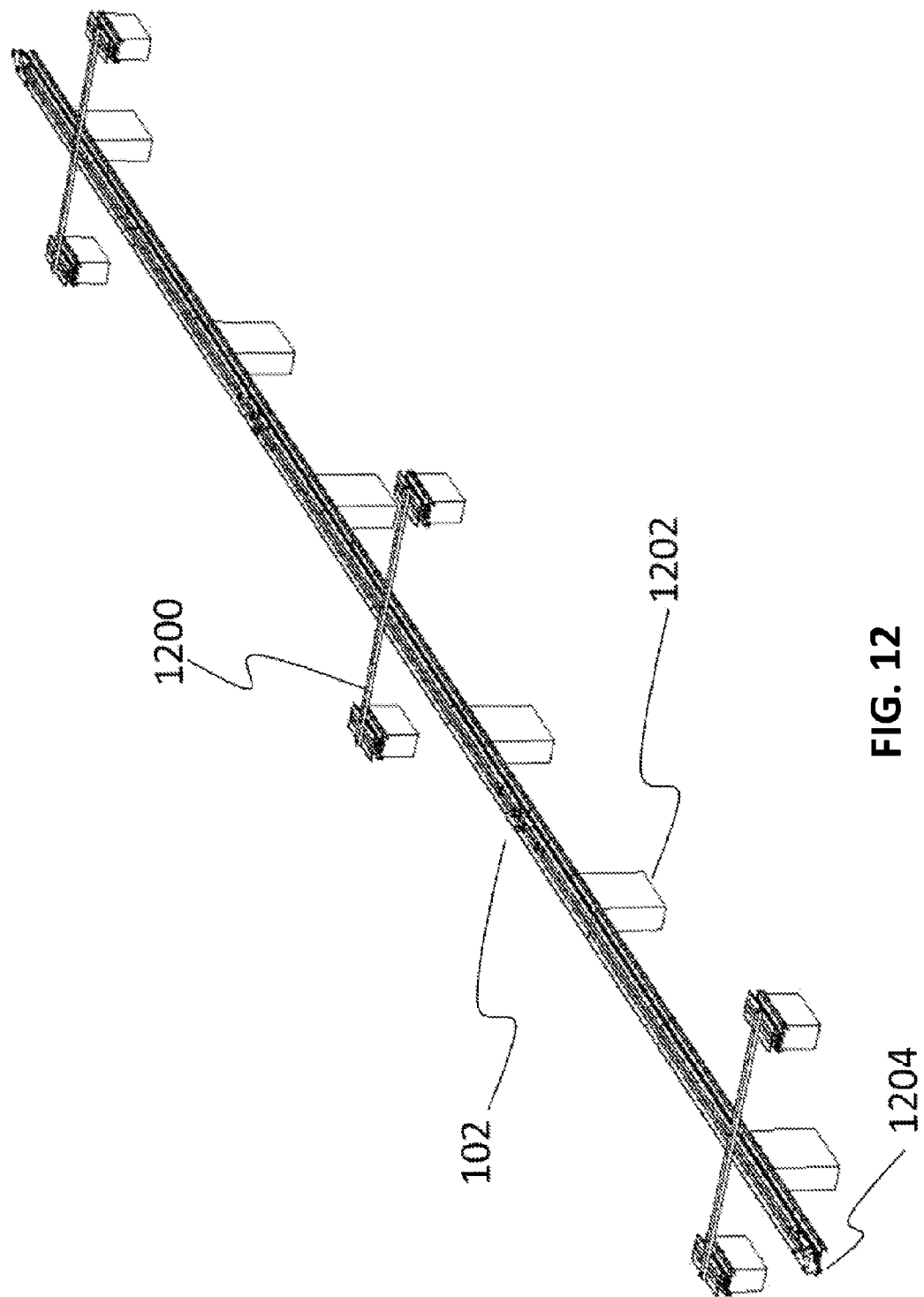
FIG. 12 is a schematic drawing of a floating frame beam disclosed herein.

Referring now to FIG. 12, an isometric view of the floating frame beams 102 is shown. Frame beams 102 could be constructed of a light, water-resistant yet strong and rigid material such as aluminum and is traversed at two or more points along its length by outriggers 1200. The frame beam 102 can be supported along its length by a number of foam floats 1202. At its two extremities, the frame beam 102 can be attached to frame links 1204.

Figure 13:
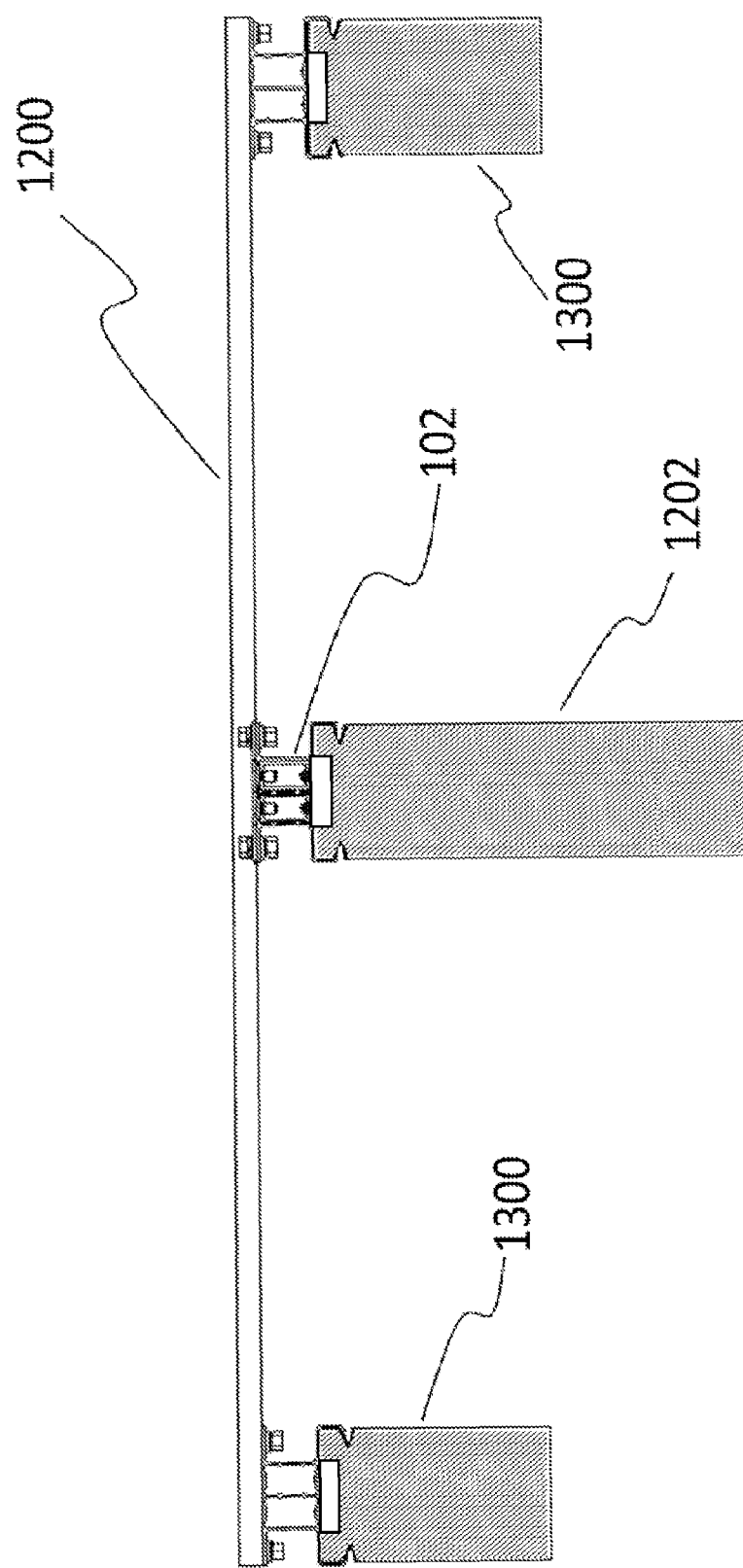
FIG. 13 is a cross section of the floating frame beam shown in FIG. 12.

Referring now to FIG. 13, a cross section of the floating frame beam 102 is shown. The floating frame beam 102 is supported by foam floats 1202 which provide buoyancy. Due to the nature of the system design, no or minimal bending or twisting stresses act upon the floating frame beam 102 thus lending stability and strength to the entire system. The outriggers 1200 are constructed of a light, water-resistant yet strong and rigid material such as aluminum and can be connected to the floating frame beam 102 for example at right angles. The outriggers 1200 are supported at their extremities by outrigger floats 1300 providing rotational stability to the floating frame beams 102.

Figure 14:
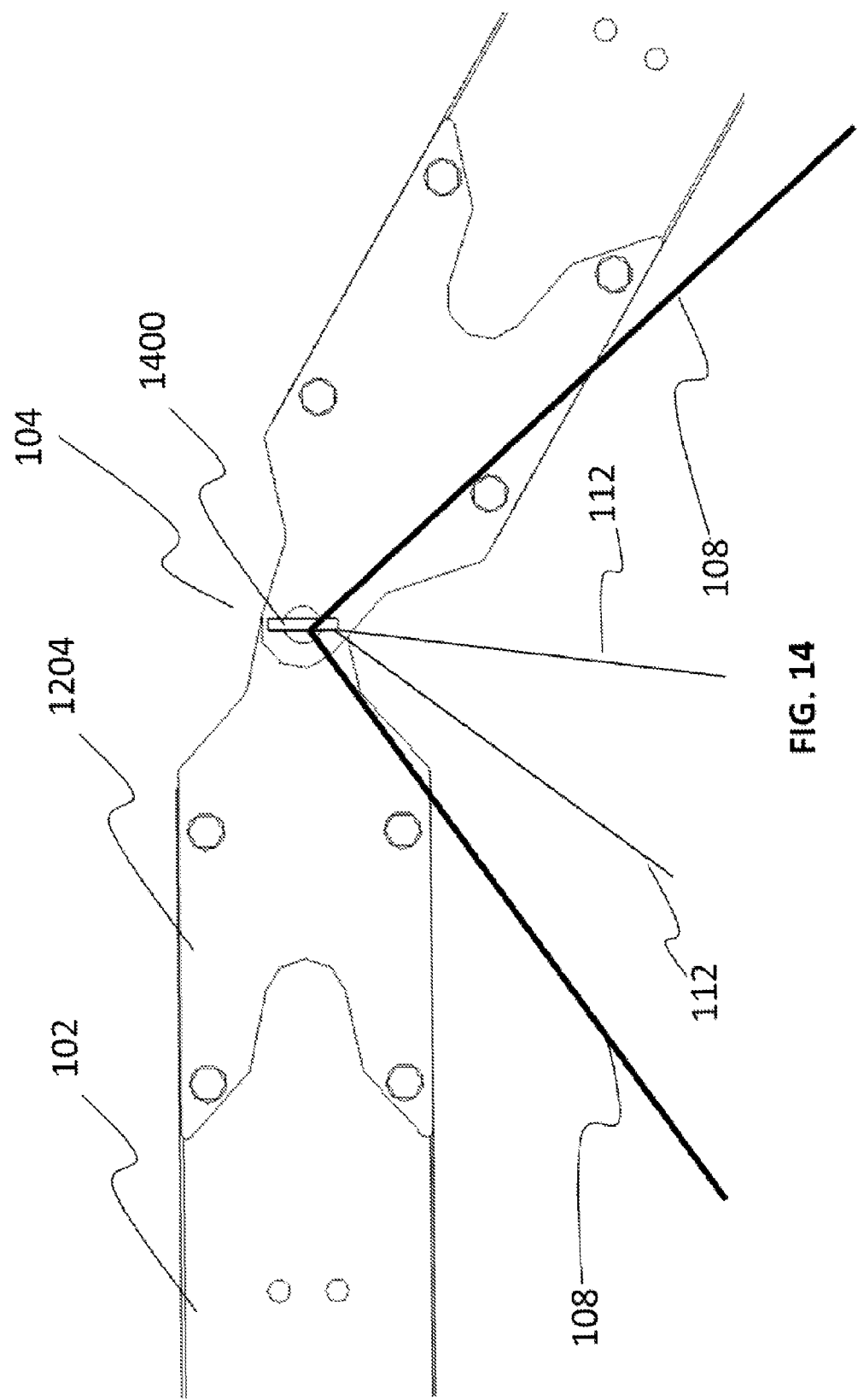
FIG. 14 is an exploded view of a hinged floating frame beam joint from the top.

Referring now to FIG. 14, the connections between the floating frame beams 102 is shown in a top view. Frame links 1204 are rigidly fastened to the ends of the frame beams 102. These frame links 1204 may be made of a rigid material such as stainless steel. Two adjacent frame links 1204 can be in contact in an overlapping fashion, and a connection means such as frame link eye-bolt 1400 connects the two overlapping frame links 1204 in such a way that the frame links 1204 are unable to disconnect from each other, while at the same time are able to rotate freely around the eye-bolt 1400 thus providing a flexible angle between the two frame links 1204. The assembly thus formed is called a hinged joint 104 and is used as a point of fastening at least two of the frame cords 108 and any number of lattice tension cords 112 from zero up to as many as needed.

Figure 15:
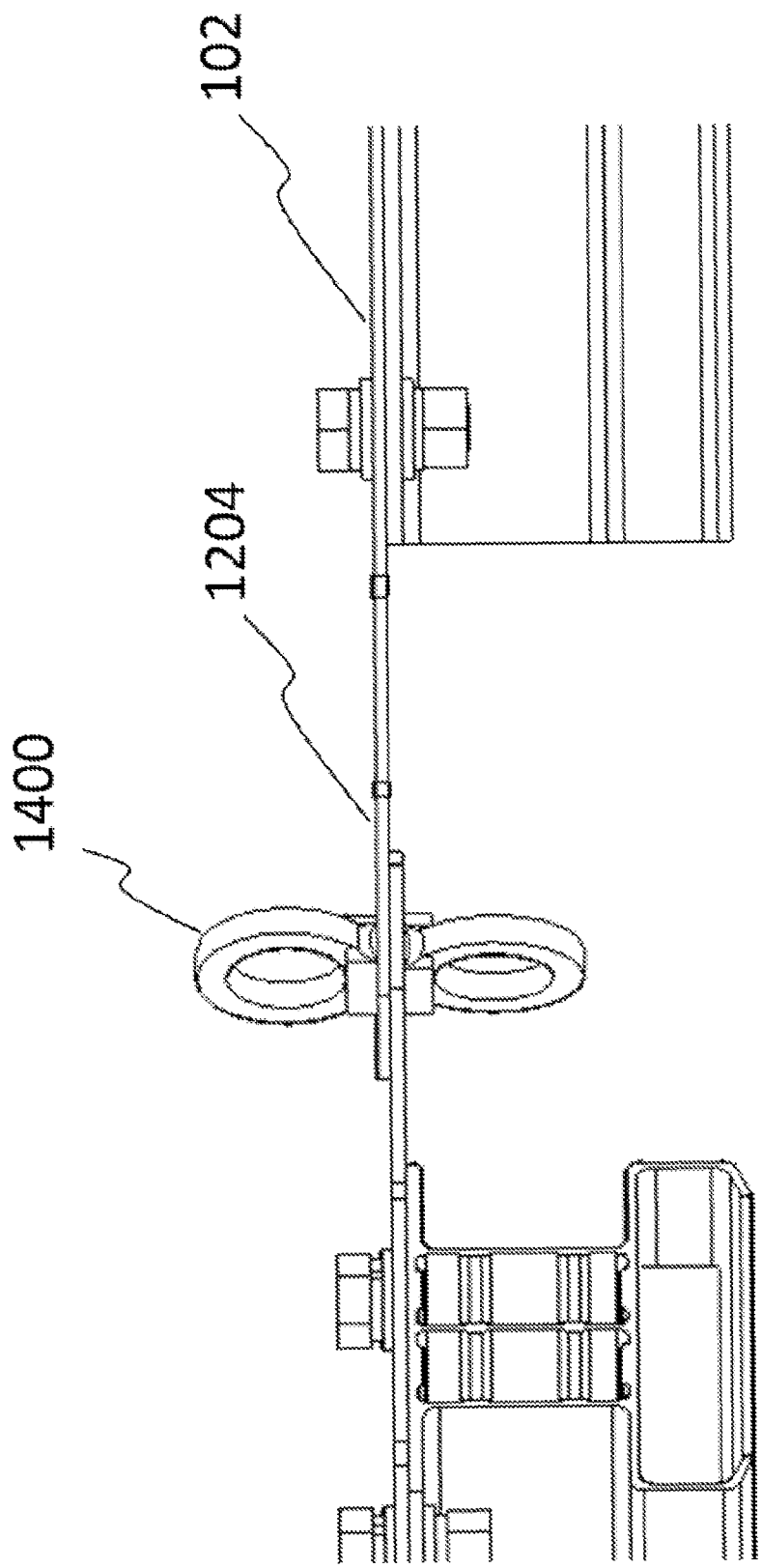
FIG. 15 is an exploded view of a hinged floating frame beam joint from the side.

Referring now to FIG. 15, one embodiment of the connections between the segments of the frame beams 102 is shown in a side view, for example the eye bolt 1400 connects the frame links 1204.

Figure 16:
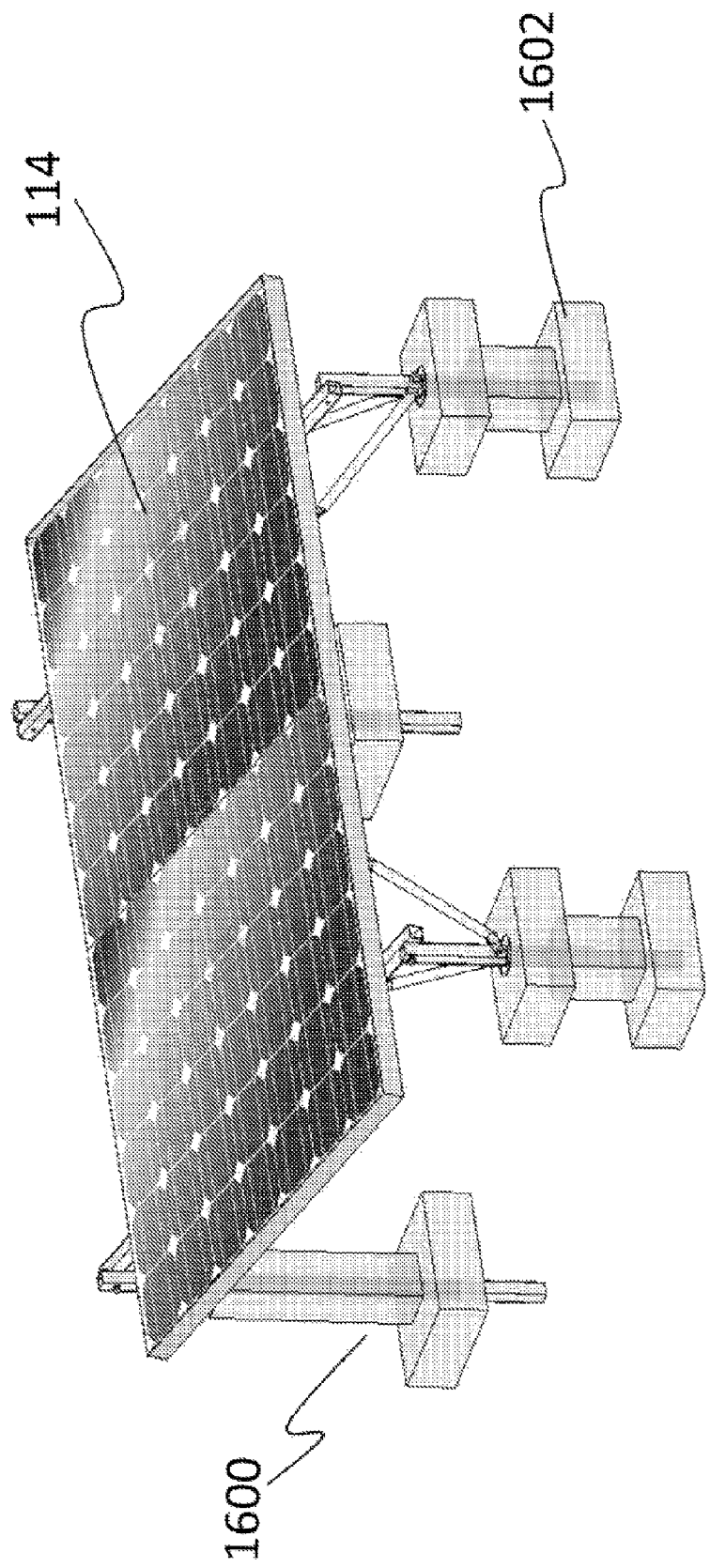
FIG. 16 is a schematic drawing of an example of a photo-voltaic module with floats.

Referring now to FIG. 16, a schematic view is shown of a number of photovoltaic module floats 1600, 1602 fastened to the underside of the photovoltaic modules 114. The module floats 1600, 1602 are shaped such that when immersed in the water, under conditions of no wind, the surface/face of the module 114 floats at a tilt angle to the horizontal surface of the water. The purpose of this tilt is to enable optimization of sunlight collection on the photovoltaic modules 114, and to allow water to flow freely off the face of the modules 114 under gravitational force when required for purposes of cleaning the modules 114 for example by washing with water, and to allow rainfall or spray from the water surface to drain off the modules 114.

Figure 17:
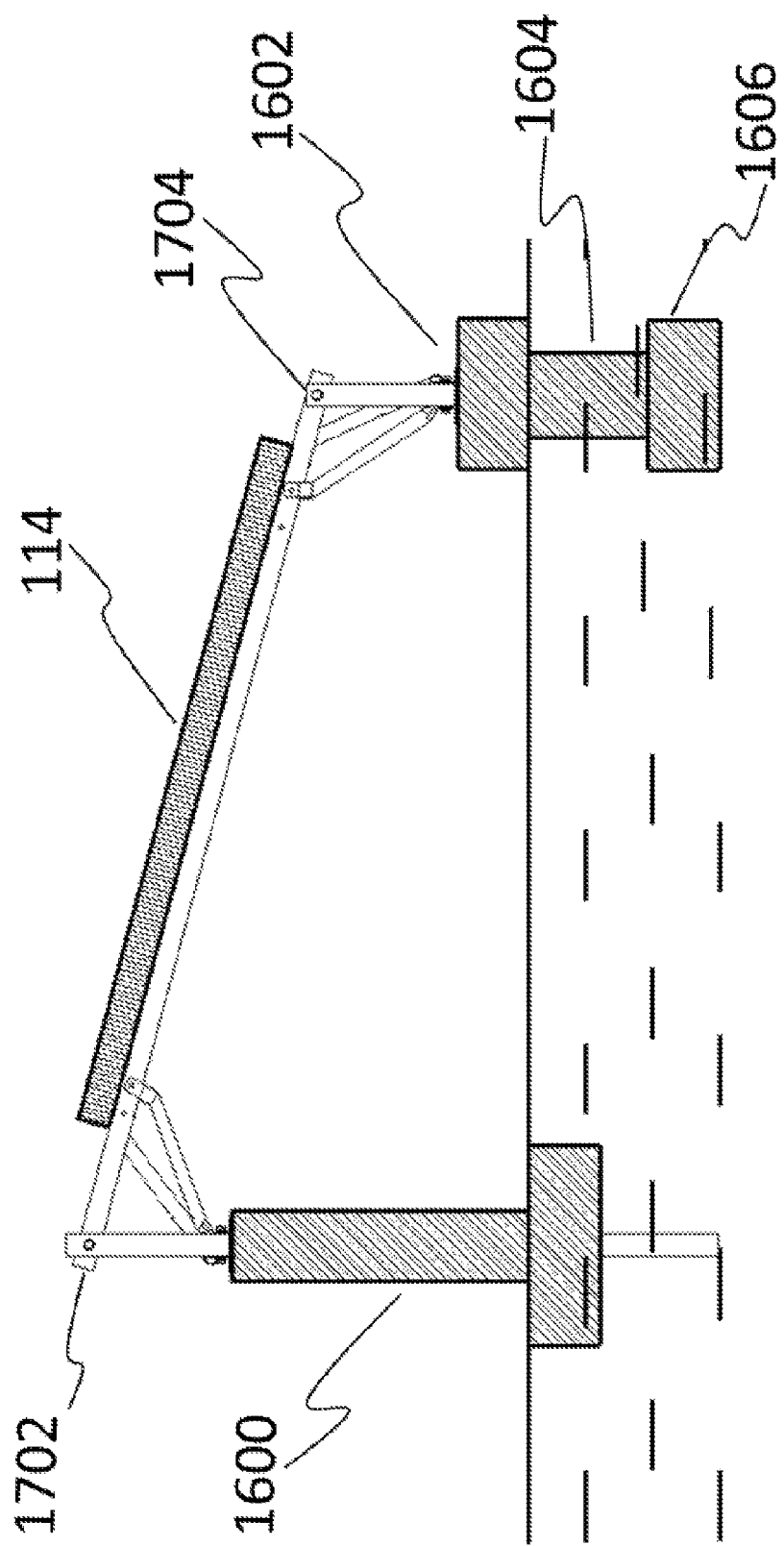
FIG. 17 is a side view of the photo-voltaic module with floats shown in FIG. 16.

Referring now to FIG. 17 a side view of the photovoltaic module 114 attached to module floats 1600, 1602 is shown. It can be seen that the module floats 1600 on a first higher end 1702 of the module 114 are not identical in shape and size to the module floats 1602 on the second lower end 1704 of the module 114. The floats 1600 and 1602 may each have two parts, a submerged part and an above the surface part. The submerged part of the lower end float 1602 may have two parts, an upper submerged part 1604 and a lower submerged part 1606 of differing cross sections. This will be explained herein below.

Figure 18:
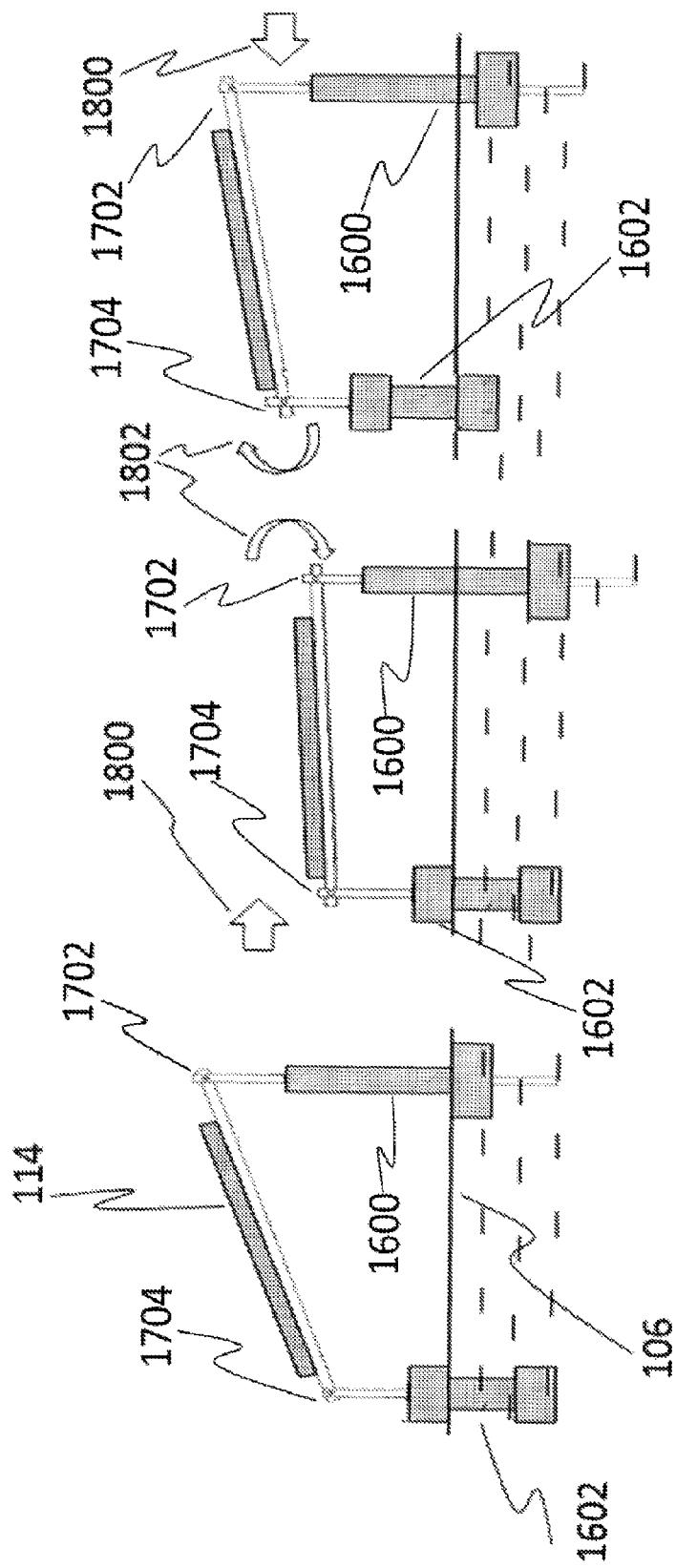
FIG. 18 includes FIGS. 18*a*-18*c* which present a side view of the self-adjusting photo-voltaic module under the influence of wind.

Referring now to FIG. 18 provided is one exemplary embodiment of the system under the influence of varying wind loads. FIG. 18*a* shows the photovoltaic modules 114 floating on the surface of the water 106 under conditions of no wind. Due to the unique structure of the module mount afforded by module floats 1600, 1602 the module 114 may form a tilt angle of, for example, approximately 15 degrees to the water surface 106. According to some embodiments the tilt angle may be from 5-45 degrees. This is accomplished by ensuring that the submerged volume of module float 1600 and the submerged volume of module float 1602 are equal and that the density of the material from which the module floats 1600 and module floats 1602 is essentially identical. As the weight of module 114 is evenly distributed across the module floats 1600 and 1602, the module 114 rests at the angle defined by the relative heights of module floats 1600 and floats 1602. A tilt angle may be optimized for the maximum exposure to the sunlight, and also facilitate washing (natural or initiated).

Considering now the case under which a strong wind 1800 is experienced from the direction at left of the figure as shown in FIG. 18*b*. Due to the vertical component vector of the force of the wind 1800 on the module 114, a rotational moment 1802 is experienced by the module 114, increasing the vertical force acting on floats 1600 and 1602. This increased force drives float 1600 and therefore first higher end 1702 deeper in the water while float 1602 and therefore second lower end 1704 remains substantially in its rest position (or depresses slightly) due to the shape of the floats 1600, 1602. The rotation of the module 114 thus reduces the action cross section presented by the module 114 to the wind 1800, with the resultant reduction in the horizontal component of the wind force.

Considering now the case under which a strong wind 1800 is experienced from the direction at the right of the figure as shown in FIG. 18*c*. Due to the upward vertical component vector of the force of the wind 1800 on the module 114, a rotational moment 1802 is experienced by the module 114, increasing the upward vertical force acting on floats 1600, 1602. This increased force lifts float 1602 and therefore second lower end 1704 out of the water while float 1600 and therefore first higher end 1702 remains substantially in its rest position (or lifts slightly) due to the shape of the floats 1600, 1602. The rotation of the module 114 thus reduces the action cross section presented by the module 114 to the wind 1800, with the resultant reduction in the horizontal component of the wind force.

This mechanism ensures that the force exerted by the wind 1800 on the entire array of the system is minimal, and thus allows the use of a lighter more flexible construction.

Figure 19:
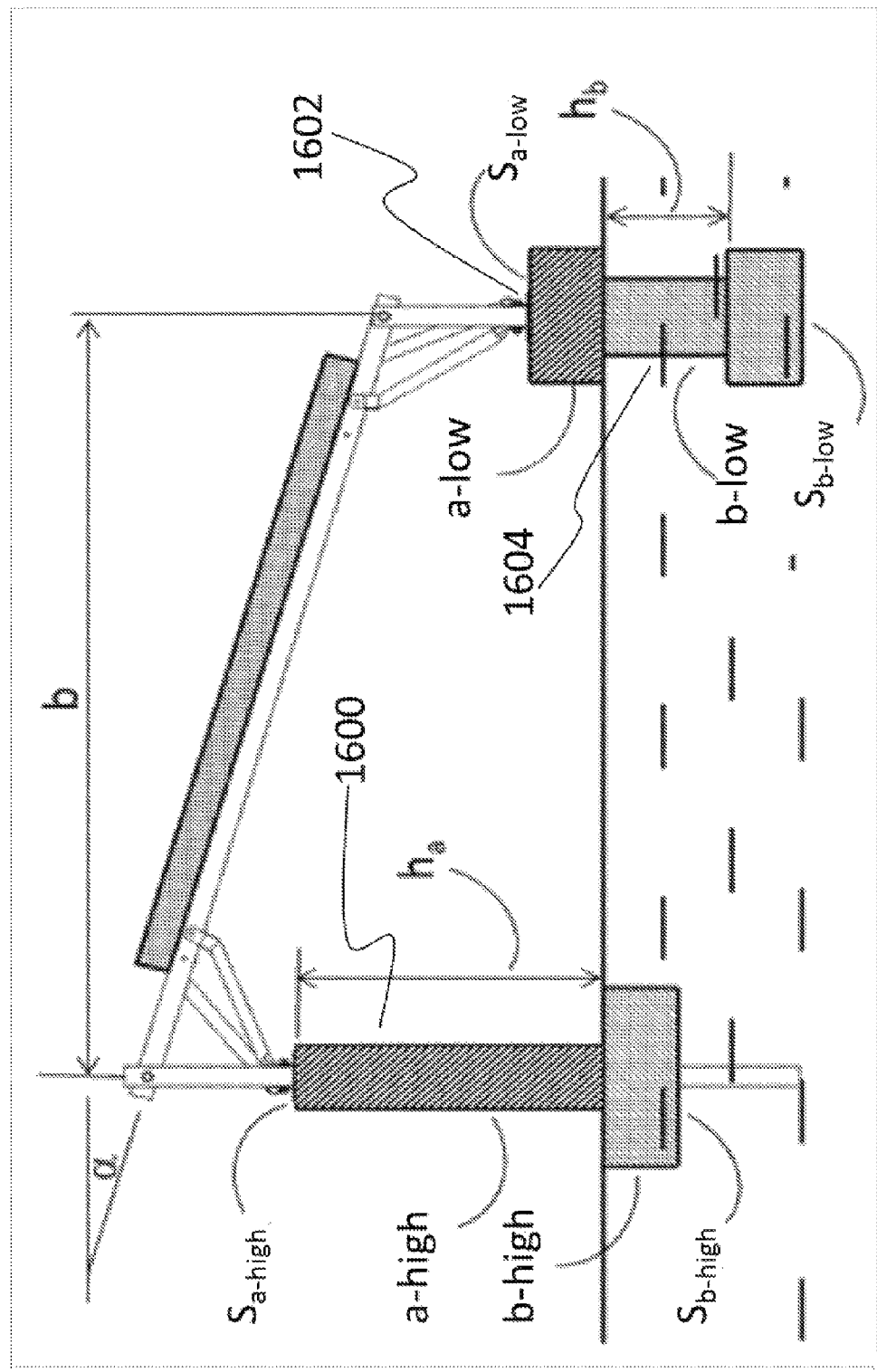
FIG. 19 is a side view of a photo-voltaic module with floats, indicating various geometrical properties regarding the size and shape of the module floats.

Referring now to FIG. 19, various geometrical conditions regarding the size and shape of the module floats 1600, 1602 are discussed.

Let:

$\alpha$=the tilt angle between the module surface and the horizontal (e.g. surface of the water);

b=distance between centers of high module float 1600 and low module float 1602;

Vb-high=Volume of submerged section of float b-high;

Vb-low=Volume of submerged section of float b-low;

V=total volume of submerged sections of all floats of a module;

Sb-high=The sum of surface cross sections of all underwater floats on high module floats 1600;

Sb-low=The sum of surface cross sections of all upper parts 1604 of all submerged floats on low module floats 1602;

Sa-high=The sum of surface cross sections of all above water floats on high module floats 1600;

Sa-low=The sum of surface cross sections of all above water floats on low module floats 1602;

ha=Height of float above water on high module float 1600;

hb=Height of the upper part 1604 of the submerged float on low module float 1602;

And where:

Vb-high=Vb-low

V=P/$\rho$ where P=Weight of modules+Frame in Kg and $\rho$=1,000 Kg/m$^3$

The following conditions must apply:

$$h_a \geq b*tg\alpha \text{ and } h_b \geq b*tg\alpha$$

$$S_{b\text{-}high} > V/b*tg\alpha \quad S_{b\text{-}low} < V/4*b*tg\alpha$$

$$S_{a\text{-}high} < V/4*b*tg\alpha \quad S_{a\text{-}low} > V/b*tg\alpha$$

Referring to FIG. 20 a mathematical simulation demonstrates the effectiveness of the photovoltaic module mount discussed above, in reducing the wind generated forces acting upon a floating module. The horizontal axes X represent the wind speed in meters/second at the height of the modules above the water. The vertical axes Y represent, on a logarithmic scale, the various forces experienced by the module expressed in Newtons.

Referring to FIG. 20a the drag force per square meter acting upon a photovoltaic module tilted at 15° respective to the surface of the water is shown as a function of the speed of the wind incident upon the photovoltaic module. Curve A represents the force acting upon a photovoltaic module mounted on a standard fixed mount while Curve B represents the force acting upon an identical photovoltaic module mounted on a floating mount of the system. Still referring to FIG. 20a the vertical axis Y represents the drag force experienced by the module expressed in Newtons. In this instance the drag force experienced by the module in Curve B is shown to be reduced by a factor of over two orders of magnitude at high wind speeds relative to the drag force experienced by the module in Curve A.

Referring to FIG. 20b the elevation force per square meter acting upon a photovoltaic module tilted at 15° respective to the surface of the water is shown as a function of the speed of the wind incident upon the photovoltaic module.

The vertical axis Y represents the vertical elevation force experienced by the module expressed in Newtons. Curve A represents the force acting upon a photovoltaic module mounted on a standard fixed mount while Curve B represents the force acting upon an identical photovoltaic module mounted on a floating mount of the system. Still referring to FIG. 20b the vertical axis Y represents the elevation force experienced by the module expressed in Newtons. In this instance the elevation force experienced by the module in Curve B is shown to be reduced by a factor of over an order of magnitude at high wind speeds relative to the elevation force experienced by the module in Curve A.

The embodiment shown in FIG. 20 and discussed above, is just one possible embodiment of the principle involved in which a module is floated on the water surface by means of module floats and in which the module floats are asymmetric and afford resistance to further immersion in the water on one side of the module and further elevation out of the water on the other side of the module. Other embodiments of this principle are known to those skilled in the art.

Figure 21:
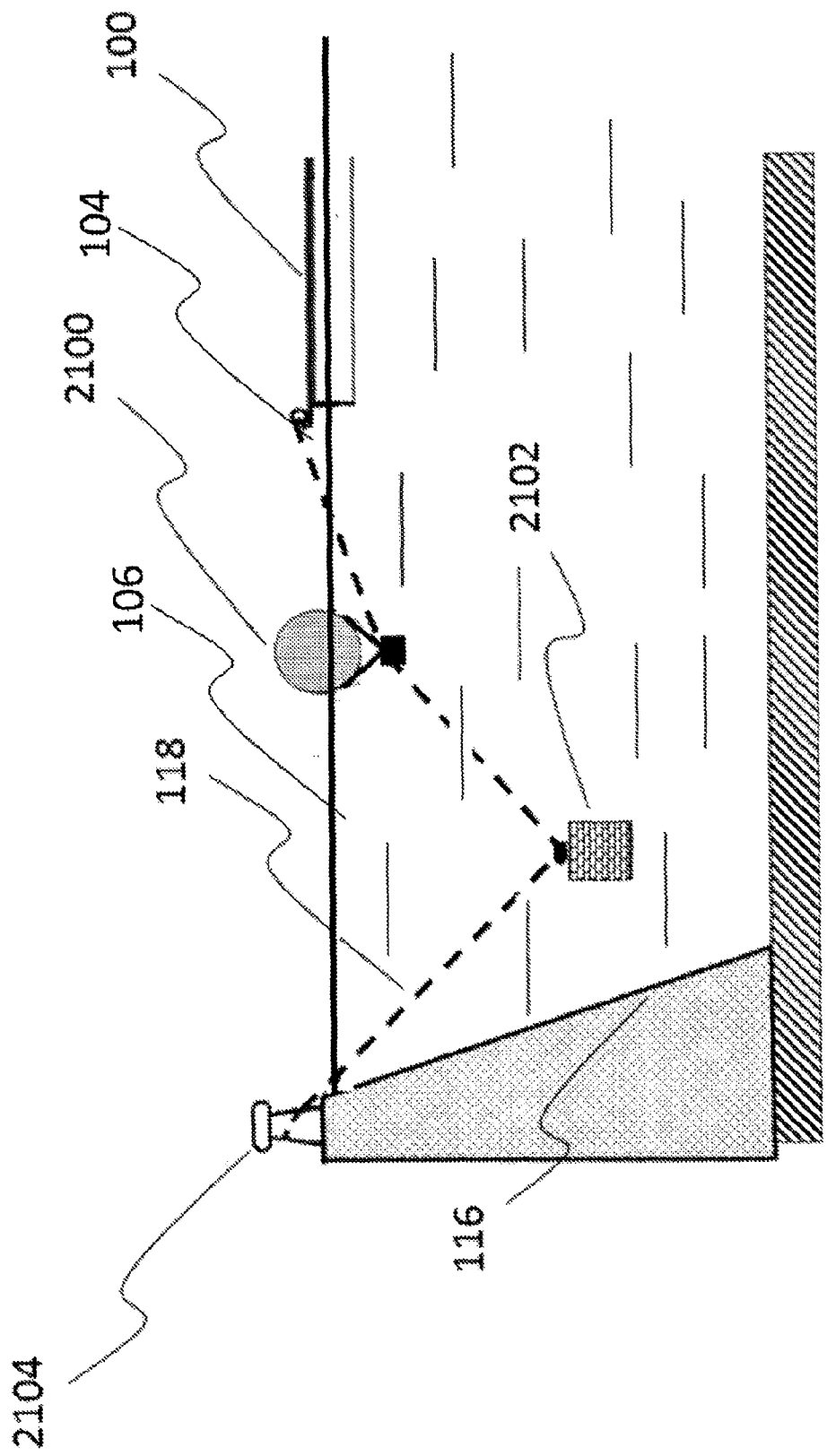
FIG. 21 provides a scheme of anchoring the device to the shore.

Referring now to FIG. 21 a method of anchoring the installation is shown. An anchoring cord 118 can be fastened on one end to a hinged joint 104 of the floating frame 100 of the system. The other end of the anchoring cord 118 is attached to an anchoring buoy 2100. The anchoring buoy 2100 can be further connected by an anchoring cord 118 to a tension weight 2102 which is submerged in the water 106. The tension weight 2102 may be further connected by an anchoring cord 118 to a bollard 2104 mounted securely on the shore 116 of the water body 106. The vertical downward force of the tension weight 2102 may be deconstructed into two vectors, the vertical one being countered by the upward force due to the buoyancy of the buoy 2100, and the horizontal one exerting tension on the floating frame 100 of the system towards the shoreline 116.

Figure 22:
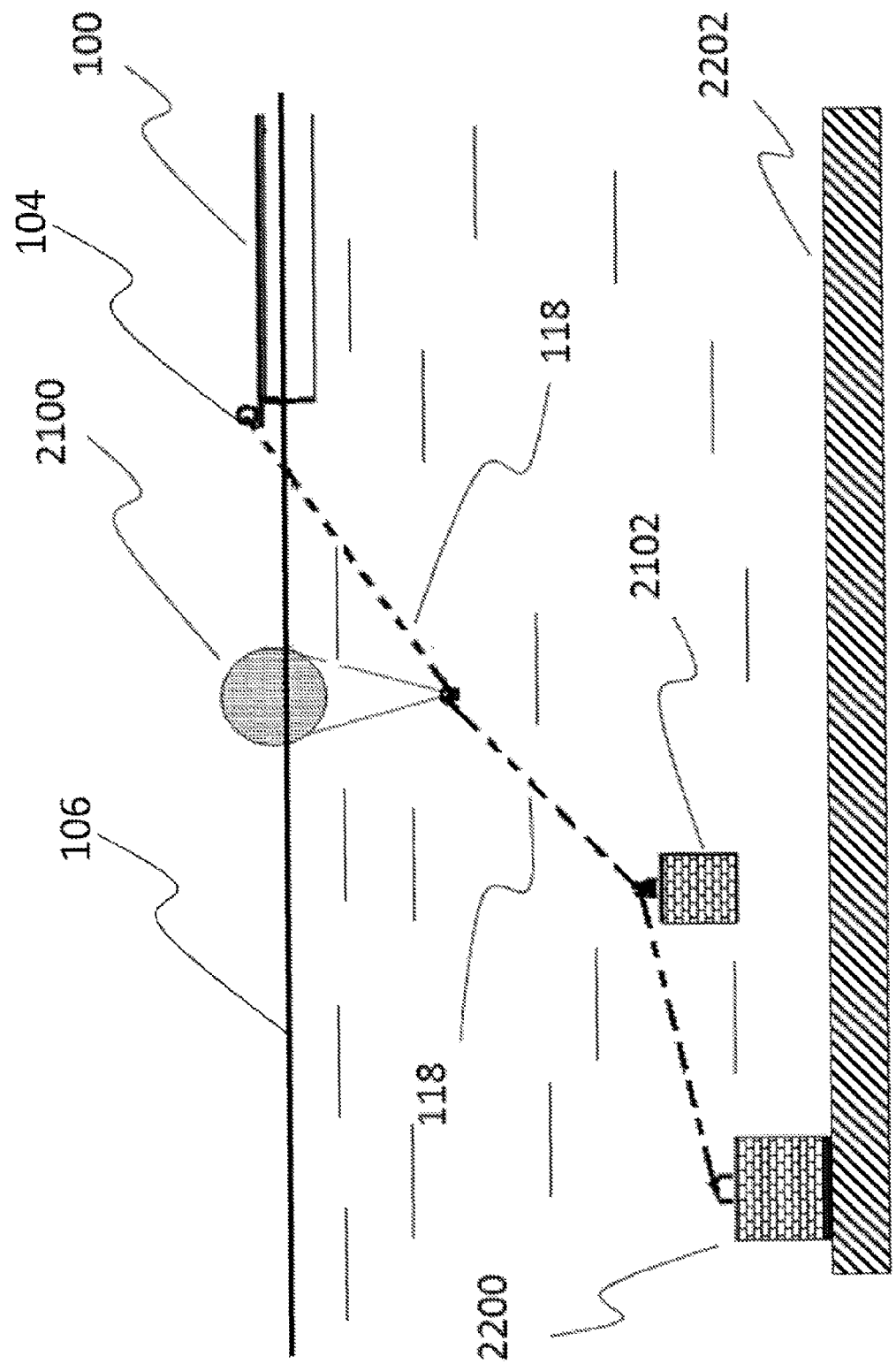
FIG. 22 provides a scheme of anchoring the device to the bed of a water body.

Referring now to FIG. 22, an alternative method of anchoring the system is shown, for cases for example where the system is distant from the shoreline. An anchoring cord 118 can be fastened on one end to a hinged joint 104 of the floating frame 100 of the system. The other end of the anchoring cord 118 is attached to an anchoring buoy 2100. The anchoring buoy 2100 is further connected by an anchoring cord 118 to a tension weight 2102 which is submerged in the water 106. The tension weight 2102 is further connected by an anchoring cord 118 to an anchoring block 2200 positioned on the water bed 2202 of the water body 106. The vertical downward force of the tension weight 2102 may be deconstructed into two vectors, the vertical one being countered by the upward force due to the buoyancy of the buoy 2100, and the horizontal one exerting tension on the floating frame 100 of the system towards the position of the anchoring block 2200.

The anchoring block 2200 may be replaced by any other method of securing the anchoring cord 118 to the water bed 2202.

Figure 23:
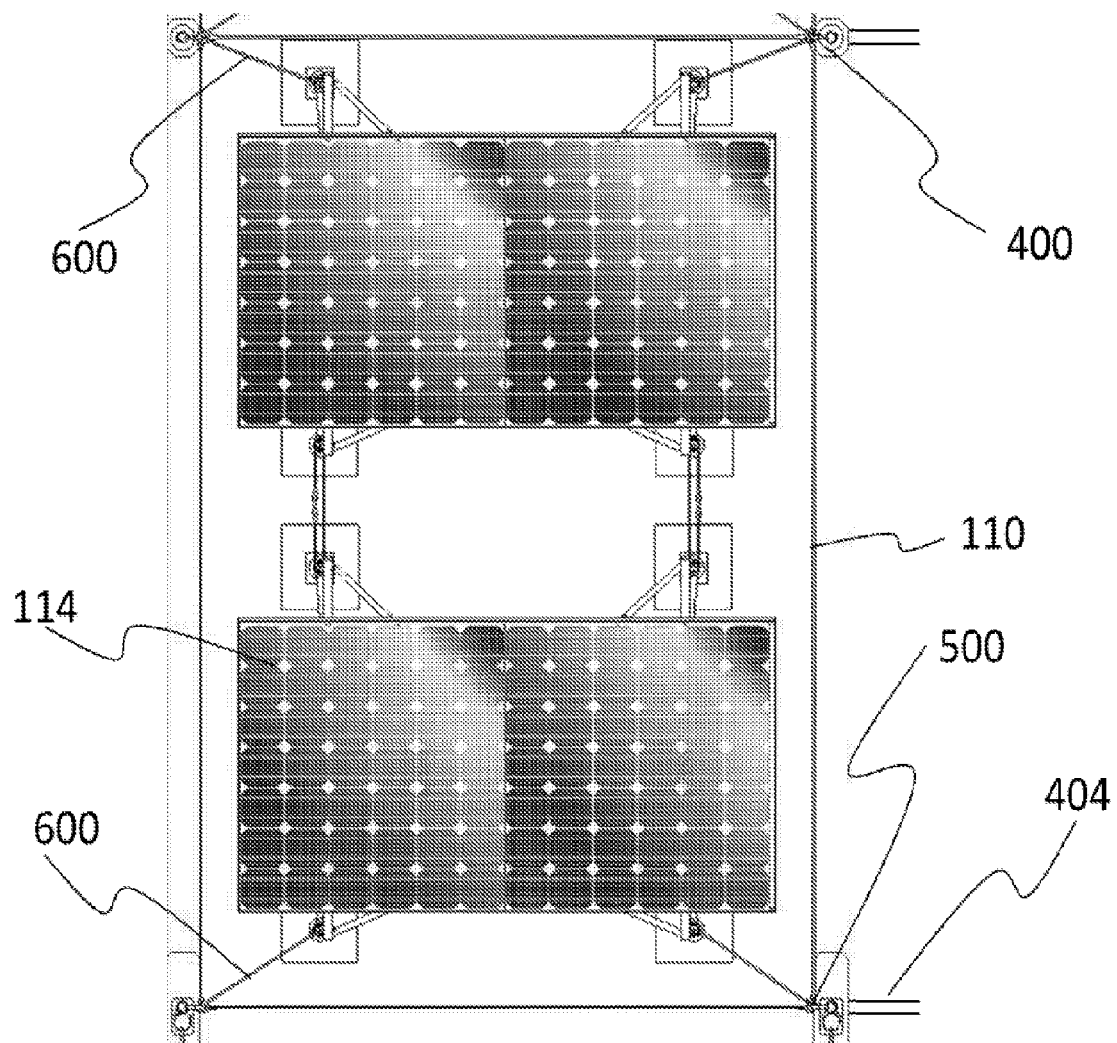
FIG. 23 is an exploded view of two modules attached to nodes in a cell.

Referring now to FIG. 23, an exemplary embodiment of the structure and function of the nodes 400 is shown. The nodes 400 serve to connect the lattice cords 110 as well as for securing the module cords 600 and the "U"-Links 404. The module cords 600 can be connected to the nodes 400 via a means such as a quick release clip 500. The purpose of this connection is to ensure the accurate location of the modules 114 with respect to the lattice cords 110 and to isolate the stresses acting on each module 114 from the other modules 114.

Figure 24:
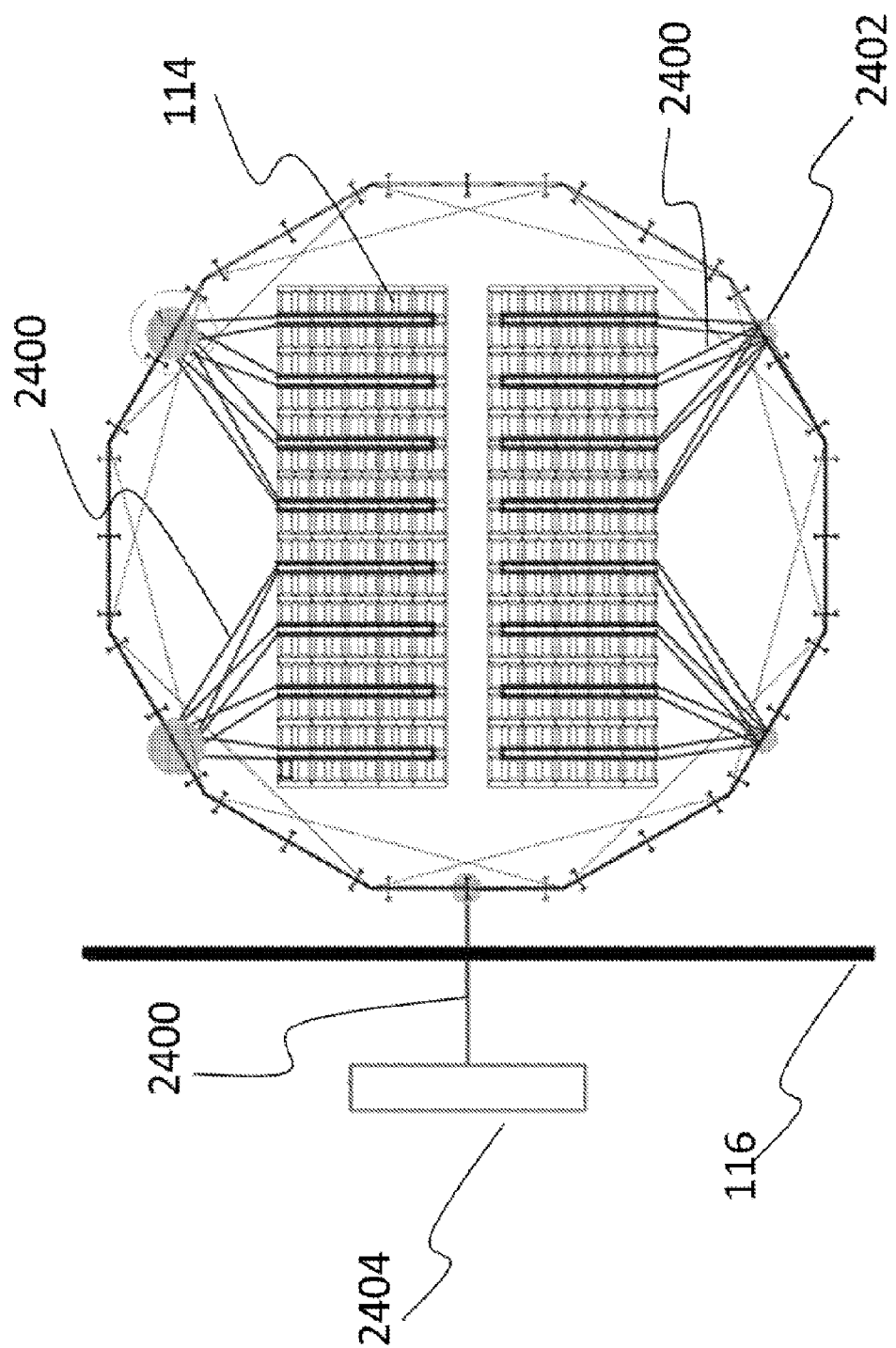
FIG. 24 is a scheme of electrical connections of the device.

Referring now to FIG. 24 we see an exemplary embodiment of the electrical connection of photovoltaic modules 114 by means of electrical cabling 2400. Each row of modules 114 can be electrically connected by an electric cable 2400. The electric cabling 2400 may run the length of the row of modules. The electrical cables 2400 may be gathered at one or more connection boxes 2402. From there the electricity is transferred to the shore 116, for example by means of an electric cable 2400 to an electric load 2404.

Referring now to FIG. 25 we see an example of an embodiment of a method of linking together a number of floating frames 100 to form a larger installation of two or more devices. When the number of frame beams 102 in each floating frame 100 is X, and X may be expressed as X=6N where N is an integer, it is possible to pack the floating frames 100 such that they share common frame beams 102 and/or common frame hinged joints 104. This structure then provides added strength to the overall system as well as reducing cost. The structure is repeating and may be extended to any required size. The case where N=1 is trivial, and FIG. 20 shows the case for two examples where N=2 and N=3 (FIG. 25a and FIG. 25b representing 12 and 18 floating beams 102, respectively). In some of the embodiments, anchoring of the installation is accomplished by connection to the frame hinges 104 of the peripheral floating beams 102 and the entire system may use one anchoring system connected to a peripheral frame.

Although various embodiments have been described herein, many modifications and variations to those embodiments may be implemented. Also, where materials are disclosed for certain components, other materials may be used. The foregoing description and following claims are intended to cover all such modification and variations.

Any patent, publication, or other disclosure material, in whole or in part, that is said to be incorporated by reference herein is incorporated herein only to the extent that the incorporated materials does not conflict with existing definitions, statements, or other disclosure material set forth in this disclosure. As such, and to the extent necessary, the disclosure as explicitly set forth herein supersedes any conflicting material incorporated herein by reference.

Citation or identification of any reference in this application shall not be construed as an admission that such reference is available as prior art to the invention.

Section headings are used herein to ease understanding of the specification and should not be construed as necessarily limiting.

What is claimed is:

1. A floating solar photovoltaic device comprising:
   at least one solar photovoltaic module, each solar photovoltaic module comprising a first side supported by a first floating support member and a second side, opposite to said first side, supported by a second floating support member, said floating support members supporting an underside of said solar photovoltaic module which is opposite to a topside of said solar photovoltaic module;
   wherein said first floating support member comprises a first vertical member and a first buoyant base extending from a lower end of said first vertical member initially submerged below a water surface, said first buoyant base shaped to have a larger upward buoyant force than said first vertical member;
   and wherein said second floating support member comprises a second vertical member and a second buoyant base extending from a lower end of said second vertical member initially submerged below said water surface, said second buoyant base shaped to have a larger upward buoyant force than said second vertical member, and an upper buoyant base extending from an upper end of said second vertical member and initially not submerged below said water surface, said upper buoyant base shaped to have a larger upward buoyant force than said second vertical member;
   and wherein said first vertical member is longer in vertical height than said second vertical member such that said solar photovoltaic module is initially tilted with said first side higher than said second side;
   and wherein a wind force acting on the topside of said solar photovoltaic module urges the first side of said solar photovoltaic module downwards towards the water surface more than the second side and a wind force acting on the underside of said solar photovoltaic module urges the second side of said solar photovoltaic module upwards away from the water surface more than the first side.

2. The floating solar photovoltaic device according to claim 1, further comprising a plurality of solar photovoltaic modules, each of said solar photovoltaic modules being connected by cords to an internal frame and said internal frames being arranged in an array of rows and columns.

3. The floating solar photovoltaic device according to claim 2, wherein adjacent rows of said array are separated from one another by a service lane.

4. The floating solar photovoltaic device according to claim 3, wherein said service lane is formed by a link connecting adjacent internal frames, said link having a submerged portion that defines a width and depth of said service lane.

5. The floating solar photovoltaic device according to claim 2, wherein said internal frames are interconnected by rows and columns of lattice cords.

6. The floating solar photovoltaic device according to claim 5, wherein said lattice cords intersect at nodes.

7. The floating solar photovoltaic device according to claim 5, further comprising a floating frame comprising floating frame beams connected by hinged joints, wherein said lattice cords are connected to said floating frame.

8. The floating solar photovoltaic device according to claim 7, wherein said lattice cords are connected to said hinged joints.

* * * * *